United States Patent [19]

Shiraki et al.

[11] Patent Number: 4,628,072

[45] Date of Patent: Dec. 9, 1986

[54] MODIFIED BLOCK COPOLYMER COMPOSITION

[75] Inventors: Toshinori Shiraki, Yamato; Fusakazu Hayano, Chigasaki; Hideo Morita, Yokohama, all of Japan

[73] Assignee: Asahi Kasei Kogyo Kabushiki Kaisha, Osaka, Japan

[21] Appl. No.: 432,923

[22] PCT Filed: Aug. 13, 1982

[86] PCT No.: PCT/JP82/00316

§ 371 Date: Sep. 30, 1982

§ 102(e) Date: Sep. 30, 1982

[87] PCT Pub. No.: WO83/00492

PCT Pub. Date: Feb. 17, 1983

[30] Foreign Application Priority Data

Aug. 13, 1981 [JP] Japan ............................ 56-125882
Aug. 24, 1981 [JP] Japan ............................ 56-131650

[51] Int. Cl.$^4$ .................. C08L 51/00; C08L 53/00; C08L 53/02

[52] U.S. Cl. ............................ 525/57; 525/64; 525/66; 525/67; 525/68; 525/84; 525/95; 525/96; 525/98

[58] Field of Search .............. 525/66, 92, 96, 64, 525/67, 68, 71, 95, 87, 84, 98

[56] References Cited

U.S. PATENT DOCUMENTS

| | | |
|---|---|---|
| 3,792,124 | 2/1974 | Davison et al. . |
| 3,845,163 | 10/1974 | Murch . |
| 3,972,961 | 8/1976 | Hammer et al. . |
| 4,017,557 | 4/1977 | Hammer et al. . |
| 4,041,103 | 8/1977 | Davison et al. . |
| 4,143,095 | 3/1979 | Lee, Jr. ................... 525/71 |
| 4,218,545 | 8/1980 | Serini et al. . |
| 4,256,853 | 3/1981 | Naylor et al. ............ 525/71 |
| 4,292,414 | 9/1981 | Saito et al. . |
| 4,427,828 | 1/1984 | Hergenrother et al. ...... 525/66 |
| 4,429,076 | 1/1984 | Saito et al. ............. 525/66 |

FOREIGN PATENT DOCUMENTS

| | | |
|---|---|---|
| 50-85695 | 10/1975 | Japan . |
| 55-38803 | 8/1980 | Japan . |
| 998439 | 7/1965 | United Kingdom . |
| 1403797 | 8/1975 | United Kingdom ......... 525/66 |

*Primary Examiner*—Allan M. Lieberman
*Attorney, Agent, or Firm*—Birch, Stewart, Kolasch & Birch

[57] ABSTRACT

A modified block copolymer composition comprising a thermoplastic polymer and a modified block copolymer consisting essentially of a base block copolymer of a monovinyl substituted aromatic hydrocarbon polymer block and an olefin compound polymer block having an ethylenic unsaturation degree not exceeding 20%, the base block copolymer having a molecular unit containing a carboxylic acid group and/or a group derived therefrom grafted thereto. The modified block copolymer composition of the present invention is a resinous composition excellent in impact resistance, adhesion, paint adhesion, weatherability, resistance to thermal deterioration, transparency and gloss or a rubbery or leather-like composition excellent in heat resistance, abrasion resistance, compression set resistance, adhesion, transparency, oil resistance, weatherability and resistance to heat aging.

18 Claims, No Drawings

MODIFIED BLOCK COPOLYMER COMPOSITION

FIELD OF THE INVENTION

The present invention relates to a modified block copolymer composition comprising a thermoplastic polymer and a modified block copolymer.

More particularly, the present invention relates to a resinous modified block copolymer composition excellent in impact resistance, adhesion, paint adhesion, weatherability, resistance to heat aging, transparency and gloss and also to a rubbery or leather-like modified block copolymer composition excellent in heat resistance, abrasion resistance, compression set resistance, adhesion, transparency, oil resistance, weatherability and resistance to heat aging. Each of the above-mentioned compositions comprises a thermoplastic polymer and a modified block copolymer comprising a base block copolymer of a monovinyl substituted aromatic hydrocarbon polymer block and an olefin compound polymer block having an ethylenic unsaturation degree not exceeding 20%, the base block copolymer having a molecular unit containing a carboxylic acid group and/or a group derived therefrom grafted thereonto.

DESCRIPTION OF THE PRIOR ART

Recently, thermoplastic resins such as polyamides, thermoplastic polyesters, thermoplastic polyurethanes, polyoxymethylene resins, polycarbonates resins, polysulfone resins, nitrile resins, polyphenylene ether resins and polyarylene sulfide resins have been widely used for mechanical parts and electrical parts for which excellent mechanical characteristics, high heat resistance and good durability are required. Weight reduction of the body of an automobile has been promoted to decrease fuel expenses to one of the energy-saving measures, and thermoplastic resins have attracted attention as light-weight materials for automobile parts which have excellent mechanical characteristics and durability.

However, these thermoplastic resins have some defects and fail to sufficiently satisfy requirements demanded in their application fields.

For example, polyoxymethylene resins and nitrile resins are advantageous in that they have very high tensile strength, flexural strength and flexural modulus, they can provide very tough molded articles and they are excellent in solvent resistance, but these resins are inferior in paint adhesion and they cannot advantageously be used as automotive exterior and interior trims or as exterior decorative materials of household electrical appliances. Polycarbonates resins have a very high mechanical strength and their impact strength is very high, but these resins are defective in that the paint adhesion is relatively poor. Furthermore, polyamides, thermoplastic polyesters, polysulfone resins, polyphenylene ether resins and polyarylene sulfide resins have a good heat resistance and a high mechanical strength, but they are defective in that the impact resistance is poor.

Block copolymers comprising a monovinyl substituted aromatic hydrocarbon and a conjugated diene compound, especially styrene-butadiene block copolymers, are polymeric materials which have recently attracted attentions.

Characteristic properties of these block copolymers differ according to the content of the monovinyl substituted aromatic hydrocarbon. More specifically, a block copolymer having a relatively low content of the monovinyl substituted aromatic hydrocarbon, even though it is unvulcanized, has a good elasticity at room temperature and shows rubbery characteristics. On the other hand, a block copolymer having a relatively high content of the monovinyl substituted aromatic hydrocarbon is excellent in transparency and impact resistance and shows resinous characteristics. Moreover, a block copolymer comprising a monovinyl substituted aromatic hydrocarbon and a conjugate diene compound shows at high temperatures flow characteristics similar to those of a thermoplastic resin, and this block copolymer is advantageous in that the block copolymer can easily be molded by an ordinary extruder or injection molding machine. However, the above-mentioned block copolymers are fatally defective in that the weatherability and resistance to thermal deterioration are poor, and therefore, they have been used only in the fields where such properties are not required. Furthermore, shoes prepared from these block copolymers are inferior to clogs prepared from a vinyl chloride polymer or the like in abrasion resistance and resistance to compression set. Accordingly, improvements of characteristics for overcoming these disadvantages have been desired.

In order to improve the weatherability and resistance to heat aging of the above-mentioned block copolymers, hydrogenating the conjugated diene compound polymer block in the block copolymers have been proposed in Canadian Pat. No. 815,575 and U.S. Pat. No. 3,431,323.

Although the weatherability or resistance to heat aging is improved to some extend according to this method, the hydrogenated block copolymer is defective in that the adhesion to other materials such as other plastics, metals, glass and woven fabrics is drastically degraded. As means for eliminating this defect, U.S. Pat. No. 3,792,124, discloses a method in which an ionically crosslinked product comprising ethylene and an α,β-ethylenically unsaturated carboxylic acid is incorporated into the hydrogenated block copolymer. However the composition prepared by the method desclosed in U.S. Pat.No. 3,792,124 does not have satisfactorily improved adhesion to other materials, and the composition is defective in that peeling is readily caused in the bonded surface under high humidity conditions or when immersed in water.

As a means for overcoming these defects of thermoplastic resins or block copolymers, there has been proposed a method in which a thermoplastic resin is mixed with a block copolymer to form a mixed polymer composition. For example, there can be mentioned mixed polymer compositions comprising a styrene-butadiene blocked copolymer, a styrene-isoprene block copolymer or a block copolymer obtained by partially hydrogenating the above-mentioned copolymer as one component of different polymers for providing a composition having excellent properties and a polar polymer such as a polyamide, polyester or polyurethane as the other component (see U.S. Pat. No. 4,017,558, U.S. Pat. No. 3,975,459, Japanese Patent Application Laid-Open Specification No. 75651/1975, U.S. Pat. No. 4,218,545 and U.S. Pat. No. 4,041,103). However, in these compositions, the block copolymer or hydrogenated block copolymer component is poor in compatibility with the polar polymer and the obtained mixed polymer composition is heterogeneous, and the properties cannot be satisfactorily improved. Moreover, when the mixed polymer composition is laminated with other material such as a metal, the adhesion between the mixed polymer composition and the metal is insufficient and peeling is readily caused.

As is apparent from the foregoing description, although thermoplastic resins and block copolymers comprising a monovinyl substituted aromatic hydrocarbon and a conjugated diene compound have various excellent properties, they cannot be materials sufficiently satisfying requirements demanded in the fields where they are actually used. Moreover, the mixtures of different polymers proposed for overcoming the defects of the thermoplastic resins or block copolymers do not have a satisfactorily improved characteristics. Accordingly, development of a polymer composition having properties required in various fields, for example, in the fileds of mechanical parts, electrical parts, automobile parts, construction materials, sheets and films has been strongly desired in the art.

It is therefore a primary object of the present invention to provide a resinous modified block copolymer composition which is excellent in impact resistance, paint adhesion, weatherability, resistance to heat aging, transparency, gloss and adhesion. Another object of the present invention is to provide a rubbery or leather-like modified block copolymer composition which is excellent in heat resistance, abrasion resistance, resistance to compression set, adhesion, weatherability, resistance to heat aging, transparency and oil resistance.

SUMMARY OF THE PRESENT INVENTION

The present inventors have extensively and intensively researched polymer compositions comprising different polymers with a view to improving the compatibility between the different polymers and developing excellent polymer composition retaining characteristics of the respective polymers. As a result, it has been determined that a modified block copolymer comprising a base block copolymer having a monovinyl substituted aromatic hydrocarbon polymer block and an olefin compound polymer block having an ethylenic unsaturation degree not exceeding 20% and a molecular unit containing a carboxylic acid group and/or a group derived therefrom, which is grafted to the base block copolymer, has a good compatibility with thermoplastic polymers such as polar group-containing polar thermoplastic polymers, polyoxymethylenes, or polycarbonates and that a modified block copolymer composition comprising this modified block copolymer and a thermoplastic polymer is excellent over conventional compositions in mechanical characteristics and has very excellent weatherability and resistance to heat aging. The present invention has been made based on such novel findings.

More specifically, in accordance with the present invention, there is provided a modified block copolymer composition comprising:

(a) at least one thermoplastic polymer selected from the group consisting of polar thermoplastic polymers each containing at least one polar functional group, polyoxymethylenes, polycarbonates, modified polycarbonates, polysulfones, modified polysulfones, nitrile polymers, polyphenylene ethers, modified polyphenylene ethers, polyarylene sulfides and modified polyarylene sulfies; and (b) at least one modified block copolymer comprising a base block copolymer of at least one monovinyl substituted aromatic hydrocarbon polymer block A and at least one olefin compound polymer block B having an ethylenic unsaturation degree not exceeding 20%, the base block copolymer having at least one molecular unit grafted thereonto, with the at least one molecular unit containing at least one member selected from a carboxylic acid group and groups derived therefrom, the polar thermoplastic polymer excluding the modified block copolymer (b).

The modified block copolymer composition of the present invention is characterized in that a composition having characteristics of a resin (hereinafter often referred to as "resinous composition"), a composition having characteristics of a rubber (hereinafter often referred to as "rubbery composition") and a composition having characteristics intermediate between characteristics of a resin and characteristics of a rubber (hereinafter often referred to as "leather-like composition") can be optionally selected according to an intended use by appropriately adjusting the ratio between the components (a) and (b) and the content of the monovinyl substituted hydrocarbon in the base block copolymer of the modified block copolymer. When the composition of the present invention is a resinous composition, it is especially excellent in impact resistance, adhesion, paint adhesion, weatherability, resistance to heat aging, transparency and gloss, and when the composition of the present invention is a rubbery or leather-like composition, it is especially excellent in heat resistance, abrasion resistance, resistance to compression set, adhesion, transparency, oil resistance, weatherability and resistance to heat aging.

In the modified block copolymer composition of the present invention, since the modified block copolymer component (b) contains a reactive carboxylic acid group or a group derived therefrom in the molecule, when the component (a) is a polar thermoplastic polymer containing a polar group reactive with a carboxylic acid group or a group derived therefrom, chemical bonding is caused by mutual reaction of both the components or ionic crosslinkage is formed by both the components through a metal ion or the like, whereby the component (a) is strongly bonded to the component (b). When the component (a) is a polar group-free thermoplastic polymer, both the components show an excellent compatibility with each other because of physical mutual actions. Accordingly, the modified block copolymer composition of the present invention is excellent over conventional mixed different polymer compositions having an insufficient impact resistance due to a poor mutual compatability in that the modified block copolymer composition of the present invention has excellent mechanical characteristics, and furthermore, the modified block copolymer composition of the present invention has both the characteristics of the component (a) and the characteristics of the component (b) which is practically very valuable. Moreover, since the olefin compound polymer block of the modified block copolymer has an ethylenic unsaturation degree not exceeding 20%, the modified block copolymer composition of the present invention is excellent in weatherability, and resistance to heat aging over conventional block copolymers having a high ethylenic unsaturation degree, for example, styrene-butadiene block copolymers.

DETAILED DESCRIPTION OF THE INVENTION

The present invention will now be described in detail.

The component (a) of the modified block copolymer composition of the present invention is at least one thermoplastic polymer selected from the group consisting of polar thermoplastic polymers each containing at least one polar functional group, polyoxymethylenes, polycarbonates, modified polycarbonates, polysulfones, modified polysulfones, nitrile polymers, polyphenylene ethers, modified polyphenylene ethers, polyarylene sulfides and modified polyarylene sulfides, and the component (a) excludes the component (b). As the polar thermoplastic polymer containing at least one polar functional group, any polymer having a functional group capable of chemically linking to or capable of exhibiting a strong physical mutual action with a carboxylic acid group and/or a group derived therefrom present in the modified block copolymer (b) can be used. As preferred examples of the functional group, there can be mentioned an amino group, a hydroxyl group, a thiol group, a carboxyl group, an isocyanate group, an epoxy group and groups derived therefrom, such as a urethane group, an ester group, an amide group, an ammonium salt group and a metal carboxylate group. Thermoplastic polymers conatining at least one functional group selected from the foregoing groups are preferably used as the component (a). These functional groups may be bonded to either the terminals or the side chains of the polymers. As preferred examples of the polar thermoplastic polymer containing such polar functional group, there can be mentioned polyamides, thermoplastic polyesters, thermoplastic polyurethanes, vinyl alcohol polymers, vinyl ester polymers and ionomers. These polar thermoplastic polymers will now be described in detail.

As the polyamide, there can be mentioned a polycondensate of a dicarboxylic acid and a diamine, a polycondensate of a α-aminocarboxylic acid and a polymer produced by ring-opening polymerization of a cyclic lactam. More specifically, nylon-6, nylon-66, nylon-610, nylon-11, nylon-12, and copolymers thereof, such as nylon-6/nylon-66 and nylon-6/nylon-12 copolymers, are preferred. From the viewpoint of the processability of the composition, it is preferred that the number average molecular weight of the polyamide be 200 to 30,000, especially 200 to 20,000 and that the melting point of the polyamide be 150° to 270° C., especially 150° to 220° C. In the present invention, not only one polyamide but also a mixture of two or more of the polyamides may be used.

The polyester which is used in the present invention is a thermoplastic polyester having an ester linkage in the molecule, and a polyester having a structure formed by polycondensation of a dicarboxylic acid with a glycol is preferred. Polyesters of this type are obtained by polycondensing a dicarboxylic acid or a lower ester, acid halide or acid anhydride thereof with a glycol. As the starting aromatic or aliphatic dicarboxylic acid, there are preferably used oxalic acid, malonic acid, succinic acid, glutaric acid, pimelic acid, suberic acid, adipic acid, sebacic acid, azelaic acid, 1,9-nonane-dicarboxylic acid, 1,10-decane-dicarboxylic acid, 1,16-hexadecane-dicarboxylic acid, terephthalic acid, isophtahlic acid, p,p'-dicarboxydiphenyl, p-carboxyphenoxyacetic acid and 2,6-naphthalene-dicarboxylic acid. Mixtures of two or more of these dicarboxylic acids may also be used. Of the above-mentioned dicarboxylic acids, terephthalic acid and isophthalic acid are particularly preferred. An aliphatic or aromatic glycol (or diol) is used as the other starting material of the polyester. For example, there can be mentioned ethylene glycol, 1,3-propane diol, 1,2-propane diol, 1,4-butane diol, 1,6-hexane diol, 1,4-chlorohexane diol, 1,10-decane diol, neopentyl glycol and p-xylene glycol. These glycols may be used singly or in the form of a mixture of two or more of them. Of these glycols, alkylene glycols having 2 to 10 carbon atoms are preferred, and ethylene glycol and 1,4-butane diol are particularly preferred. Particularly valuable polyesters produced by polycondensation of the dicarboxylic acid with the glycol are polyethylene terephthalate and polybutylene terephthalate, and modified products thereof in which the monomer units are partly substituted with other monomer units.

From the standpoint of processability and mechanical strength of the composition, the number average molecular weight of the polyester is generally 500 to 100,000 and preferably 5,000 to 50,000.

The polymerization method for formation of the polyester used in the present invention is not particularly critical, and the polymerization may be carried out according to customary procedures. For example, there may be mentioned a method in which the above-mentioned acid component, for example, terephthalic acid, isophthalic acid, an aliphatic dicarboxylic acid or an ester thereof is subjected to direct esterification or ester exchange reaction with at least one member selected from the above-mentioned glycols at a time or stepwise and polymerization is then conducted. Catalysts, stabilizers, modifiers and additives customarily used may optionally be added.

Another valuable polyester which may be used in the present invention is a polyactone obtained by ring-opening polymerization of a cyclic lactone such as pivalolactone, β-propiolactone or ε-caprolactone.

The above-mentioned polyesters have hydroxyl or carboxyl groups at the terminal ends of the molecule, and these terminal functional groups may be rendered unreactive by reaction with a monofunctional alcohol or carboxylic acid. It is preferred that all or part of the terminal ends of the molecule of the polyester have functional groups capable of reacting with the functional groups of the modified block copolymer. The polyester having these functional groups has a remarkably improved compatibility with the modified block copolymer because part of these functional groups is reacted with the modified block copolymer.

In the present invention, the foregoing polyesters may be used alone or in combination thereof.

The thermoplastic polyester referred to in the present invention includes polyesters used as fibers, films or resins, such as polyethylene terephthalate, low crystalline polyesters having a lower melting point, and polyether-ester block copolymers containing hard segments and soft segments in the molecule.

Thermoplastic polyurethanes which are used in the present invention are divided into completely thermoplastic polymers and incompletely thermoplastic polymers according to synthetic conditions, that is, the molar ratio of the NCO group of the diisocyanate relative to the OH group of the starting bifunctional polyol or glycol. More specifically, the polyurethane synthesized in a molar ratio of about $0.95 < \text{NCO/OH} \leq 1$ is a completely thermoplastic polyurethane, and the polyurethane synthesized in a molar ratio of about $1 < \text{N-}$ CO/OH<1.1 is an incompletely thermoplastic polyurethane. As the thermoplastic polyurethane, there may be mentioned a polyurethane comprising a block of a polyol (polyester or polyether) and a diisocyanate as a soft segment and a block of a diisocyanate and a glycol as a hard segment.

As the starting polyester diol, there may be mentioned poly(1,4-butylene adipate), poly(1,6-hexane adipate) and polycaprolactone, and as the polyether diol, there may be mentioned polyethylene glycol, polypropylene glycol and polyoxytetramethylene glycol. As the glycol, there can be mentioned ethylene glycol, 1,4-butane diol and 1,6-hexane diol. As the diisocyanate, aromatic, alicyclic and aliphatic diisocyanates can be used. For example, there may be used tolylene diisocyanate, 4,4'-diphenylmethane diisocyanate, hexamethylene diisocyanate and isophorone diisocyanate.

Besides the foregoing thermoplastic polyurethanes, polyurethanes customarily used as adhesives, foams or paints may be used for the composition of the present invention, so far as they have a sufficient compatibility with the modified block copolymer used as the component (b) in the present invention.

From the standpoint of mechanical characteristics of the composition, it is preferred that the number average molecular weight of the thermoplastic polyurethane be 5,000 to 500,000, particularly 10,000 to 300,000.

In the present invention, homopolymers of vinyl esters and olefin-vinyl ester copolymers, such as polyvinyl acetate, ethylene-vinyl acetate copolymers and propylene-vinyl acetate copolymers, are preferably used as the vinyl ester polymer.

The vinyl alcohol polymers which are used in the present invention include a polymer composed of vinyl alchol units and a copolymer containing vinyl alchol units. The polymer composed of vinyl alchol units is a polymer obtained by partially or completely saponifying a vinyl ester polymer with an aqueous alkali. In the present invention, various polyvinyl alcohols can be used. An olefin-vinyl alcohol copolymer is preferably used as the copolymer containing vinyl alcohol units, and from the standpoint of processability and mechanical characteristics of the composition, an ethylene-vinyl alcohol copolymer is particularly preferred. The ethylene-vinyl alcohol copolymer is synthesized from the corresponding ethylene-vinyl acetate copolymer as the starting substance. An ethylene-vinyl acetate copolymer having a vinyl acetate content of 0.5 to 80 mole % is generally used, and an ethylene-vinyl alcohol copolymer obtained by saponifying 10 to 100 mole % of the vinyl acetate units of this ethylene-vinyl acetate copolymer is generally used.

As the commercially available vinyl alcohol polymer that can be used in the present invention, there may be mentioned EVAL manufactured and sold by Kuraray Co., Ltd., Japan and GL Resin manufactured and sold by Nippon Gosei Kagaku Co., Ltd., Japan.

The ionomer which is used in the present invention is an ionically crosslinked polymer obtained by ionically crosslinking carboxylic acid groups in a substrate copolymer of an $\alpha,\beta$-ethylenically unsaturated carboxylic acid and other monomer with at least one member selected the group consisting of monovalent, divalent and trivalent metal ions.

A copolymer of a non-polar monomer, for example, an olefin such as ethylene, propylene or butene or styrene and an $\alpha,\beta$-ethylenically unsaturated monocarboxylic acid such as acrylic acid or methacrylic acid or an $\alpha,\beta$-ethylenically unsaturated dicarboxylic acid such as maleic acid is generally used as the substrate polymer. An olefin-$\alpha,\beta$-ethylenically unsaturated carboxylic acid copolymer having an olefin content of at least 50 mole % and an $\alpha,\beta$-ethylenically unsaturated carboxylic acid content of 0.2 to 25 mole % is preferred.

The ionomer is prepared by reacting the above-mentioned substrate polymer, for example, an olefin-$\alpha,\beta$-ethylenically unsaturated carboxylic acid copolymer, with a monovalent, divalent or trivalent metal compound according to the process disclosed in Japanese Patent Application Publication No. 6810/1964. The metal compound is added in such an amount that 10 to 100 mole % of the carboxylic acid groups in the copolymer will be neutralized and participate in ionic crosslinkage.

As the olefin-$\alpha,\beta$-ethylenically unsaturated carboxylic acid, there may be mentioned, for example, an ethylene-acrylic acid copolymer, an ethylene-methacrylic acid copolymer, an ethylene-itaconic acid copolymer, an ethylene-maleic acid copolymer, an ethylene-acrylic acid-methacrylic acid copolymer and an ethylene-propylene-methacrylic acid copolymer. Of the above-mentioned copolymers, a copolymer comprising an unsaturated monocarboxylic acid, for example, an ethylene-acrylic acid copolymer or an ethylene-methacrylic acid copolymer, is preferred.

Monovalent, divalent and trivalent ions of metals of the Groups I, II, III, IV-A and VII of the Periodic Table are used as the metal ion for the production of the ionomer. For example, there may be mentioned monovalent ions such as $Na^+$, $L^+$, $K^+$, $Cs^+$ and $Ag^+$, divalent ions such as $Mg^{2+}$, $Ca^{2+}$, $Ba^{2+}$, $Zn^{2+}$, $Sr^{2+}$, $Hg^{2+}$ and $Fe^{2+}$, and trivalent ions such as $Al^{3+}$, and $Fe^{3+}$. These metal ions are reacted with the substrate polymers in the form of hydroxides, alcoholates and low carboxylic acid salts.

The ionomer can also be prepared by saponifying an olefin-$\alpha,\beta$-ethylenically unsaturated carboxylic acid ester copolymer, for example, an ethylene-methyl methacrylate copolymer or an ethylene-methyl acrylate copolymer, with a hydroxide of a monovalent, divalent or trivalent metal or partially neutralizing the resulting saponification product to convert part of the saponification product to a corresponding carboxylic acid. The so-prepared ionomer may be used as the component (a) of the composition of the present invention.

As the commercially available ionomer which can be used as the component (a) of the composition of the present invention, there may be mentioned "Surlyn" (the trade name of an ionomer manufactured and sold by Du Pont Co., U.S.A.), "Copolene" (the trade name of an ionomer manufactured and sold by Asahi-Dow Co., Ltd., Japan) and "Hi-Milan" (the trade name of an ionomer manufactured and sold by Mitsui Polychemical Co., Ltd., Japan).

The thermoplastic polymers which may be used as the component (a) of the modified block copolymer composition, other than the above-mentioned polar thermoplastic polymers, will now be described in detail.

As the polyoxymethylene which is used in the present invention, there may be mentioned a homopolymer obtained by polymerization of formaldehyde or trioxane or a copolymer comprising the above-mentioned monomer as the main component. The terminal groups of the homopolymer are generally converted to ester or ether groups to improve the heat resistance or chemical resitance. As the copolymer, there may be mentioned a copolymer of formaldehyde or trioxane with an aldehyde, a cyclic ether, a cyclic carbonate, an epoxide, an isocyanate or a vinyl compound.

An aromatic polycarbonate having a structural unit represented by the following general formula:

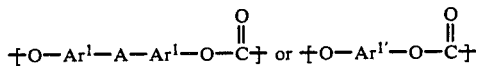

wherein $Ar^1$ and $Ar^{1'}$ stand for a phenylene group or a phenylene group substituted with an alkyl group, a substituted alkyl group, an alkoxy goup, a halogen atom or a nitro group, and A stands for an alkylene group, an alkylidene group, a cycloalkylene group, a cycloalkylidene group, a sulfur atom, an oxygen atom, a sulfoxide group or a sulfone group, is preferably used as the polycarbonate in the present invention. Poly-4,4'-dioxydiphenyl-2,2'-propane carbonate is particularly preferred.

A thermoplastic polysulfone having a structural unit represented by the following general formula:

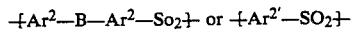

wherein $Ar^2$ and $Ar^{2'}$ stand for a phenylene group, and B stands for an oxygen atom, a sulfur atom or an aromatic diol residue, is preferred as the polysulfone that is used in the present invention. Poly(ether sulfone) and poly(4,4-bisphenol ether sulfone) are particularly preferred.

Thermoplastic homopolymers and copolymers synthesized by using at least 50% by weight of an $\alpha,\beta$-olefinically unsaturated mononitrile as the constituent monomer are preferably used as the nitrile polymer in the present invention. As the $\alpha,\beta$-olefinically unsaturated mononitrile, there may be mentioned, for example, acrylonitrile, methacrylonitrile and $\alpha$-bromoacrylonitrile. A mixture of two or more of these monomers may be used. As the monomer to be copolymrized with the $\alpha,\beta$-olefinically unsaturated mononitrile, there may be mentioned lower $\alpha$-olefins such as ethylene, propylene, isobutylene, pentene-1, vinyl chloride and vinylidene chloride; monovinyl substituted aromatic hydrocarbons such as styrene, $\alpha$-methylstyrene, vinyltoluene, chlorostyrene and methylstyrene; vinyl esters such as vinyl acetate; lower alkyl esters of $\alpha,\beta$-olefinically unsaturated carboxylic acids such as methyl acrylate and methyl methacrylate; and vinyl ethers such as vinyl methyl ether.

A polyphenylene ether having a structural unit represented by the following general formula:

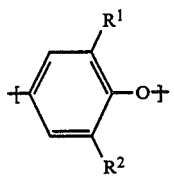

wherein $R^1$ and $R^2$ stand for an unsubstituted or substituted alkyl group having 1 to 4 carbon atom or a halogen atom, or a polyphenylene ether graft copolymer obtained by grafting a styrene type compound onto the above polyphenylene ether is preferably used as the polyphenylene ether in the present invention. As the styrene type compound used for the graft modification, there can be mentioned styrene, $\alpha$-methylstyrene, methylstyrene, tert-butylstyrene and chlorostyrene. Two or more of these styrene type compounds may be used for the graft polymerization. If desired, other copolymerizable vinyl compounds such as acrylic acid esters, methacrylic acid esters, acrylonitrile and methacrylonitrile may be grafted together with the styrene type compound. Poly(2,6-dimethyl-1,4-phenylene) ether and a styrene-grafted copolymer thereof are particularly preferred as the polyphenylene ether.

Arylene sulfide homopolymers and copolymers having a structural unit represented by the following general formula:

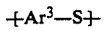

wherein $Ar^3$ stands for a phenylene group or a phenylene group substituted with an alkyl group or a substituted alkyl group, are preferably used as the polyarylene sulfide in the present invention. Polyphenylene sulfide and poly-4,4'-diphenylene sulfide are particularly preferred.

It is preferred that the modified polycarbonate, modified polysulfone, modified polyphenylene ether and modified polyarylene sulfide which is used in the present invention be respectively a blend of the above-mentioned polycarbonate, polysulfone, polyphenylene ether and polyarylene sulfide with an alkenyl aromatic hydrocarbon homopolymer and/or an alkenyl aromatic hydrocarbon copolymer as the modifying polymer. As the alkenyl aromatic hydrocarbon homopolymer or alkenyl aromatic hydrocarbon copolymer which is used for the modification, there may be mentioned polymers containing at least 50% by weight of a monovinyl substituted aromatic hydrocarbon, for example, polystyrene, a styrene-$\alpha$-methylstyrene copolymer, a butadiene-styrene block copolymer, an impact-resistant rubber-modified styrene polymer, an acrylonitrile-styrene copolymer, a styrene-methacrylic acid ester copolymer, a styrene-maleic anhydride copolymer, an acrylonitrile-butadiene-styrene copolymer, an acrylic acid ester-butadiene-styrene copolymer, a methacrylic acid ester-butadiene-styrene copolymer and mixtures of two or more of the foregoing polymers. From the standpoint of modification effect, it is preferred that the content of the modifying polymer in the blend be 10 to 70% by weight, particularly 20 to 50% by weight.

The modified block copolymer which is used as the component (b) of the composition of the present invention is at least one modified block copolymer comprising a block copolymer (hereinafter referred to as "base block copolymer") having at least one monovinyl substituted aromatic hydrocarbon polymer block A and at least one olefin compound polymer block B having an ethylenic unsaturation degree not exceeding 20%, the base block copolymer having at least one molecular unit grafted thereonto, with the at least one molecular unit containing at least one member selected from a carboxylic acid group and a group derived therefrom. The olefin compound polymer block is preferably a polymer block in which at least one olefin compound selected from mono-olefins such as ethylene, propylene, 1-butene and isobutylene, conjugated diolefins such as butadiene, isoprene and 1,3-pentadiene and non-conjugated diolefins such as 1,4-hexadiene, norbornene and norbornene derivatives is homopolymerized or copolymerized, and the ethylenic unsaturation degree of this block does not exceed 20%. The term "ethylenic unsaturation degree" as used herein is intended to mean the percent of the number of the monomer units having an unsaturated bond relative to the number of all the monomer units constituting the olefin compound polymer block. Accordinly, the term "ethylenic unsaturation degree not exceeding 20%" as used herein is intended to mean that the percent of the number of the monomer units having an unsaturated bond relative to the number of all the monomer units constituting the olefin compound polymer block does not exceed 20%. It is preferred that the ethylenic unsaturation degree of the olefin compound polymer block be not more than 15%. If the olefin compound polymer block has an ethylenic unsaturation degree exceeding 20%, the weatherability and resistance to thermal deterioration of the composition are degraded, and no good results can be obtained. Accordingly, if a diolefin such as mentioned above is used as the constituent monomer of the olefin compound polymer block, it is necessary that the ethylenic unsaturation degree should be reduced by hydrogenation or the like to such an extent that the ethylenic unsaturation degree of the olefin compound polymer block does not exceed 20%, preferably not more than 15%. A monovinyl substituted aromatic hydrocarbon may be random-copolymerized to the olefin compound polymer block. As the base block copolymer, there may be mentioned a hydrogenation product of a block copolymer of a monovinyl substituted aromatic hydrocarbon and a conjugated diene compound, and a block copolymer of a monovinyl substituted aromatic hydrocarbon and a mono-olefin. A modified block copolymer which is preferably used in the present invention is one prepared by addition-reacting the above-mentioned base block copolymer with at least one modifier selected from unsaturated carboxylic acids and derivatives thereof. A modified block copolymer which is most preferably used in the present invention is a modified block copolymer obtained by selectively hydrogenating a block copolymer (hereinafter referred to as "precursory block copolymer") comprising at least one monovinyl substituted aromtic hydrocarbon polymer block and at least one polymer block composed mainly of a conjugated diene compound at its conjugated diene compound moiety so that the ethylenic unsaturation degree of the polymer block composed mainly of the conjugated diene compound does not exceed 20%, and addition-reacting the hydrogenated block copolymer with at least one modifier selected from unsaturated carboxylic acids and derivatives thereof. A precursory block copolymer comprising at least two monovinyl substituted aromatic hydrocarbon polymer blocks and at least one polymer block composed mainly of a conjugated diene compound is especially preferred. In the polymer block composed mainly of a conjugated diene compound, it is preferred that the monovinyl substituted aromatic hydrocarbon/conjugated diene compound weight ratio be in the range of from 0/100 to 50/50, particularly from 0/100 to 30/70. In the case where the conjugated diene compound is copolymerized with the monovinyl substituted aromatic hydrocarbon in this polymer block, the distribution of the monovinyl substituted aromatic hydrocarbon may be a random distribution, a tapering distribution (the monomer content increases or decreases along the molecule chain), a partially blocked distribution or any combination thereof. In the precursory block copolymer of the present invention, a portion of a copolymer of the monovinyl substituted aromatic hydrocarbon and the conjugated diene compound having a monovinyl substituted aromatic hydrocarbon content higher than 50% by weight may be present in the transitional portion between the monovinyl substituted aromatic hydrocarbon polymer block and the polymer block composed mainly of the conjugated diene compound. In the present invention, this copolymer portion is included in the polymer block composed mainly of the conjugated diene compound.

In the precursory block copolymer, the monovinyl substituted aromatic hydrocarbon content is 5 to 95% by weight, preferably 10 to 90% by weight, more preferably 15 to 85% by weight. When the monovinyl substituted aromatic hydrocarbon content is not more than 60% by weight, preferably not more than 55% by weight, the precursory block copolymer has characteristics as a thermoplastic elastomer, and when the monovinyl substituted aromatic hydrocarbon content is more than 60%, preferably more than 70%, the precursory block copolymer has characteristics as a resinous polymer.

At least one member selected from styrene, α-methylstyrene, o-methylstyrene, m-methylstyrene, p-methylstyrene, dimethylstyrene and p-tert-butylstyrene is preferably used as the monovinyl substituted aromatic hydrocarbon consituting the precursory block copolymer, and styrene is particularly preferred. At least one member selected from butadiene, isoprene and 1,3-pentadiene is preferably used as the conjugated diene compound, and butadiene and/or isoprene is particularly preferred. The number average molecular weight of the precursory block copolymer is 20,000 to 500,000 preferably 40,000 to 300,000. It is preferred that the ratio of the weight average molecular weight relative to the number average molecular weight be in the range of from 1.05 to 10. The weight average molecular weight can be measured by the ultra-centrifugal method and the number average molecular weight can be measured by the osmotic pressure method. In the precursory polymer block, it is preferred that the vinyl content of the conjugated diene portion be 10 to 80%. When it is necessary that rubbery elasticity should be given to the modified block copolymer, it is preferred that the vinyl content be 25 to 65%, particularly 35 to 55%. The vinyl content of the precursory block copolymer can be measured by means of a nuclear magnetic resonance apparatus.

When the precursory block copolymer contains at least two monovinyl substituted aromatic hydrocarbon polymer blocks or at least two polymer blocks composed mainly of the conjugated diene, these blocks may have the same structure, or they may be different in monomer content, monomer distribution in the molecule chain, molecular weight of the block and linking manner of the conjugated diene portion.

As the mehtod for preparing the precursory block copolymer, there may be mentioned methods disclosed in British Pat. No. 895,980, British Pat. No. 1,130,770, U.S. Pat. No. 3,281,383, Japanese Patent Application Publication No. 2423/1973 and U.S. Pat. No. 3,639,517. According to each of these methods, the monovinyl substituted aromatic hydrocarbon is block-copolymerized with the conjugated diene compound in a hydrocarbon solvent using as an anion polymerization initiator an organic lithium compound or the like and if necessary using as a vinyl modifier an ether compound such as diethyl ether or tetrahydrofuran, a tertiary amine such as triethyl amine or N,N,N',N'-tetramethylethylene diamine or a Lewis base such as a phosphine compound, e.g., hexamethylphosphamide, and as a coupling agent a polyfunctional compound such as silicon tetrachloride or epoxidized soy bean oil. A block copolymer having a linear, branched or radial structure can be obtained. In the present invention, a block copolymer prepared according to any of the foregoing polymerization methods can be used. Not only one precursory block copolymer but also a mixture of two or more precursory block copolymers may be used.

The base block copolymer can be obtained by hydrogenating the above-mentioned precursory block copolymer according to a known method, for example, the method disclosed in British Pat. No. 1,020,720. It is requisite that at least 80%, preferably at least 85%, of the monomer unit having an aliphatic double bond in the polymer block composed mainly of the conjugated diene compound in the precursory block copolymer should be hydrogenated. In other words, it is requisite that the ethylenic unsaturation degree of the olefin compound polymer block B formed by conversion of the polymer block composed mainly of the conjugated diene compound by hydrogenation should not exceed 20%, preferably not exceed 15%. As pointed out hereinbefore, if the ethylenic unsaturation degree of the olefin compound polymer block exceeds 20%, the weatherability or resistance to thermal deterioration of the composition is degraded and good results can not be obtained. From the standpoint of mechanical characteristics, it is preferred that the degree of hydrogenation of the monomer units containing aromatic double bonds derived from the monovinyl substituted aromatic hydrocarbon in the monovinyl substituted aromatic hydrocarbon polymer block and the monovinyl substituted aromatic hydrocarbon copolymerized according to need to the polymer block composed mainly of the conjugated diene compound be not more than 20%. The ethylenic unsaturation degree of the olefin compound polymer block can be measured by instrumental analysis using an infrared spectrophotometer (IR) or a nuclear magnetic resonance apparatus (NMR) or by titration analysis such as iodine titration.

The base block copolymer is then modified by addition reaction with at least one modifier selected from unsaturated carboxylic acids and derivatives thereof, whereby a modified block copolymer to be used in the present invention is obtained. As the unsaturated carboxylic acid or its derivative which is used as the modifier, there may be mentioned, for example, maleic acid, maleic anhydride, maleic acid esters, maleic acid amides, maleic imides, fumaric acid, fumaric acid esters, fumaric amides, fumaric acid imides, itaconic acid, itaconic anhydride, itaconic acid esters, itaconic acid amides, itaconic acid imdes, halogenated maleic acid, halogenated maleic anhydride, halogenated maleic acid esters, halogenated maleic acid amides, halogenated maleic acid imides, cis-4-cyclohexene-1,2-dicarboxylic acid, cis-4-cyclohexene-1,2-dicarboxylic anhydride, cis-4-cyclohexene-1,2-dicarboxylic acid esters, cis-4-cyclohexene-1,2-dicarboxylic acid amides, cis-4-cyclohexene-1,2-dicarboxylic acid imides, endo-cis-bicyclo(2,2,1)-5-heptene-2,3-dicarboxylic acid, endo-cis-bicyclo(2,2,1)-5-heptene-2,3-dicarboxylic anhydride, endo-cis-bicyclo(2,2,1)-5-heptene-2,3-dicarboxylic acid esters, endo-cis-bicyclo(2,2,1)-5-heptene-2,3-dicarboxylic acid amide, endo-cis-bicyclo(2,2,1)-5-heptene-2,3-dicarboxylic acid imide, acrylic acid, acrylic acid esters, acrylic acid amide, methacrylic acid, methacrylic acid esters and methacrylic acid amide. These modifiers may be used alone or in combination thereof. Among these modifiers, unsaturated dicarboxylic acids and derivatives thereof are preferred and maleic anhydride is particularly preferred.

The modified block copolymer is obtained by grafting the above-mentioned modifier onto the base block polymer in a solution state or molten state in the presence or absence of a radical initiator. The method for preparing the modified block copolymer is not particularly critical in the present invention. However, a method providing a modified block copolymer containing an undesirable component such as gel or a modified block copolymer having an extremely high melt viscosity and degrading the processability of the composition is not preferred. For example, there is preferably adopted a method in which the base block copolymer is reacted with the above-mentioned modifier in the presence of a radical initiator in, for example, an extruder.

The amount of the molecular unit containing a carboxylic acid group or a group derived therefrom, which is contained in the modified block copolymer, that is, the amount of the unsaturated carboxylic acid or its derivative grafted onto the base block copolymer, is 0.05 to 30 parts by weight, preferably 0.1 to 20 parts by weight, more preferably 0.3 to 10 parts by weight, per 100 parts by weight of the base block copolymer, as the mean value in the entire modified block copolymer used in the present invention. When this amount of the molecular unit containing a carboxylic acid group of a group derived therefrom is smaller than 0.05 part by weight, no significant modification effect can be obtained over the unmodified block copolymer, and even if this amount exceeds 30 parts by weight, no substantial increase of the modification effect can be attained.

The content of the molecular unit containing a carboxylic acid group or a group derived therefrom in the modified block copolymer can be easily determined by infrared spectrophotometry or titration. In the present invention, the unmodified block copolymer may be contained in the modified block copolymer used as the component (b), so far as the amount of the unsaturated carboxylic acid or its derivative grafted onto the base block copolymer as the mean value in the entire component (b) is in the above-mentioned range.

In the present invention, the modified block copolymer may be an ionically crosslinked modified block copolymer. This ionically crosslinked modified block copolymer is obtained by crosslinking the above-mentioned modified block copolymer through at least one member selected from monovalent, divalent and trivalent metal ions. Namely, the crosslinked modified block copolymer is prepared by reacting the modified block copolymer with at least one crosslinking agent selected from monovalent, divalent and trivalent metal compounds.

In the ionically crosslinked modified block copolymer, the carboxylic acid group and/or the group derived therefrom of the modified block copolymer is ionized by addition of the above-mentioned crosslinking agent. The degree of ionization can be adjusted according to the amount of the crosslinking compound employed, and the degree of ionization can be determined by, for example, an infrared spectrophotometer.

The crosslinking agent is added in such an amount that a carboxylic acid group and/or a group derived therefrom, which is contained in the modified block copolymer, is partially or completely ionized. The ionization reaction is advanced substantially quantitatively, but in some case, in order to obtain the desirable degree of ionization, it is necessary to add the crosslinking agent in excess of the stoichiometrical amount. In order to obtain the ionically crosslinked modified block copolymer effectively, it is preferred that the ratio of the mole number of the metal compound relative to the total mole number of the carboxylic acid group and the group derived therefrom, contained in the modified block copolymer be in the range of from 0.1 to 3.0.

At least one member selected from compounds of metals of the Groups I, II and III of the Periodic Table is preferably used as the crosslinking agent to be added to the modified block copolymer for formation of the ionically crosslinked modified block copolymer. More specifically at least one member selected from lithium compounds, sodium compounds, potassium compounds, magnesium compounds, calcium compounds, zinc compounds and aluminum compounds is preferably used. It is preferred that these compounds are hydroxides, alcoholates or carboxylic acid salts.

As the method for obtaining the ionically crosslinked modified block copolymer, there may be mentioned a method in which the crosslinking agent is added to the melt of the modified block copolymer, a method in which the modified block copolymer is dissolved in an appopriate solvent, for example, an organic solvent such as toluene, benzene or tetrahydroruran and the crosslinking agent is added to the solution to effect the crosslinking reaction, and a method in which the crosslinking agent is added to a latex of the modified block copolymer. Any of these methods can be used for formation of the ionically crosslinked modified block copolymer to be used in the present invention.

The ionically crosslinked modified block copolymer which is used in the present invention is thermoplastic, and a composition obtained by mixing this modified block copolymer with the component (a) is processable at high temperatures, and the ionic crosslinkage is a reversible crosslinkage. These characteristic properties are not possessed by block copolymers obtained through irreversible crosslinkage such as sulfur crosslinkage, peroxide crosslinkage or irradiation crosslinkage.

The composition of the present invention includes an ionically crosslinked composition obtained by adding the crosslinkage agent to a mixture of the thermoplastic polymer as the component (a) and the modified block copolymer as the component (b) which is molten or dissolved in an appropriate solution, to effect the crosslinking reaction.

From the standpoint of mechanical characteristics of the composition, it is preferred that the monovinyl substituted aromatic hydrocarbon content of the base block copolymer of the component (b) of the modified block copolymer composition of the present invention be 5 to 95% by weight. When the modified block copolymer as the component (b) is required to have a rubbery elasticity, it is preferred that the monovinyl substituted aromatic hydrocarbon content of the base block copolymer be 5 to 60% by weight. On the other hand, when the modified block copolymer as the component (b) is required to have resinous characteristics, it is preferred that the monovinyl substituted aromatic hydrocarbon content of the base block copolymer be over 60% by weight up to 95% inclusive by weight. As pointed out hereinbefore, the modified block copolymer composition of the present invention can be a resinous composition, a rubbery composition or a leather-like composition according to the ratio of the thermoplastic polymer as the component (a) relative to the modified block copolymer as the component (b) and the monovinyl substituted aromatic hydrocarbon content of the base block copolymer of the modified block copolymer as the component (b). In the case where a resinous composition is obtained, when the monovinyl substituted aromatic hydrocarbon content of the base block copolymer is over 60% by weight up to 95% inculsive by weight, preferably 65 to 90% by weight, the component (a)/component (b) weight ratio is adjusted in the range of from 90/10 to 5/95, preferably from 85/15 to 10/90, more preferably from 80/20 to 15/85, and when the monovinyl substituted aromatic hydrocarbon content of the base block copolymer is 5 to 60% by weight, preferably 10 to 55% by weight, more preferably 15 to 50% by weight, the component (a)/component (b) weight ratio is adjusted in the range of from over 50/50 up to 98/2 inclusive, preferably from 60/40 to 95/5, more preferably from 70/30 to 90/10. When the amount of the component (b) is too small and below the above range, no substantial effect of improving the impact resistance or paint adhesion can be attained, and when the amount of the component (b) is too large, the rigidity is degraded. In the case where a rubbery or leather-like composition is prepared, when the monovinyl substituted aromatic hydrocarbon content of the base block copolymer is 5 to 60% by weight, preferably 10 to 55% by weight, more preferably 15 to 55% by weight, the component (a)/component (b) weight ratio is adjusted in the range of from 2/98 to 50/50, preferably from 5/95 to 40/60, more preferably from 10/90 to 30/70. When the amount of the component (a) is too small and below the above range, no substantial improvement of the composition as a rubbery or leather-like composition can be attained. When the amount of the component (a) is too large, the rubbery or leather-like characteristics are lost and the composition becomes resinous.

Reinforcers, fillers, antioxidants, ultraviolet absorbers, coloring agents, pigments, lubricants, flame retardants, foaming agents and other additives may be added to the modified block copolymer composition of the present invention. Specific examples of the additives which can be added to the composition of the present invention are described in "Handbook of Additive Chemicals to Rubbers and Plastics" published by Rubber Digest Co., Ltd, Japan in 1974.

For example, a composition obtained by adding 5 to 150 parts by weight, preferably 10 to 100 parts by weight, of a glass fiber to 100 parts by weight of the resinous modified block copolymer composition of the present invention is an excellent molding material having improved rigidity, heat resistance and mechanical strength. Glass fibers having a diameter of 2 to 20$\mu$ and a length of 50 to 20,000$\mu$, customarily incorporated into resins, are preferably used.

When the rubbery or leather-like modified block copolymer composition of the present invention is used as a material for a shoe sole or an industrial article, a finely divided solid such as calcium carbonate, clay, silica or titanium dioxide may be added as a filler or pigment, and a hardness adjusting agent, for example, a resin such as polystyrene or polyolefin and a moldability adjusting agent, for example, a process oil such as a paraffin oil or a naphthene oil may be added according to need. An Example of the amounts of these additives added to the modified block copolymer composition are as follows:

| | |
|---|---|
| Rubbery or leather-like composition of the present invention | 100 parts by weight |
| Resin | 30 to 100 parts by weight |
| Process oil | 50 to 100 parts by weight |
| Finely divided filler | 20 to 200 parts by weight |

The modified block copolymer composition of the present invention may be formed by mixing the components (a) and (b) by means of a mixing device appropriately selected according to the mixing ratio of the components (a) and (b) from various mixing devices such as a single screw extruder, a multiple screw extruder, a mixing roll, a Banbury mixer and a kneader. It is preferred that the mixing be carried out in the molten state. Moreover, the composition of the present invention can be formed according to a method in which the respective components are dissolved in an organic solvent such as toluene, benzene or tetrahydrofuran and the solvent is removed from the resulting mixture by heating.

The modified block copolymer composition of the present invention can be easily molded into various, practically valuable products such as sheets, foams, films and injection molded, blow molded, pressure formed and rotary molded articles having various shapes according to optional known molding methods such as extrusion molding, injection molding, blow molding and rotary molding methods.

The so-obtained molded articles formed of the modified block copolymer of the present invention may be painted or plated according to need. Any of known paints such as acrylic resin paints, vinyl-modified acrylic resin paints, alkyd resin paints, polyurethane resin paints, epoxy resin paints, phenolic resin paints, melamine resin paints and urea resin paints may be used for painting these molded articles.

A metallic feel can be imparted to the molded articles by a plating treatment. Any of the known plating methods such as chemical plating and electrical plating methods may be adopted. In case of the resinous modified block copolymer composition of the present invention comprising the ionically crosslinked modified block copolymer as the compoennt (b), when the incorporated amount of the component (a) is relatively large, the component (b) is dispersed in the component (a) in the peculiar form different from the circular or oval form observed in conventional different polymer mixtures, and therefore, when a molded article of this composition is chemically etched and then plated, a high anchor effect can be attained and a plated molded article having a high plate adhesion can be obtained.

PREFERRED EMBODIMENTS OF THE INVENTION

The present invention will now be described in more detail with reference to the following Examples.

In the Examples, the number average molecular weights of polymers were determined according to the osmotic pressure method and the weight average molecular weights were determined according to the ultracentrifugal method. Furthermore, the melt index values referred to in the Examples are those determined according to the method of ASTM D-1238.

(1) Preparation of Unmodified Block Copolymers:

Unmodified block copolymers shown in Table 1 were prepared by subjecting butadiene and styrene to anionic block copolymerization in n-hexane or cyclohexane as a solvent by using n-butyl lithium as a polymerization catalyst and tetrahydrofuran as a vinyl content adjusting agent. For example, an unmodified block copolymer A-1 was prepared by performing polymerization according to the following procedures. To an n-hexane solution containing 13 parts by weight of butadiene (butadiene concentration, 20% by weight) were added 0.1 part by weight of n-butyl lithium and 5 parts by weight of tetrahydrofuran, and polymerization was carriwed out at about 60° C. for 1 hour. After substantial completion of the polymerization of butadiene, an n-hexane solution containing 20 parts by weight of styrene (styrene concentration, 20% by weight) was added to the resulting reaction mixture and polymerization was carried out at about 60° C. for 1 hour. After substantial completion of the polymerization of styrene, an n-hexane solution containing 47 parts by weight of butadiene (butadiene concentration, 20% by weight) was added to the resulting reaction mixture and polymerization was carried out at about 60° C. for 1 hour. After substantial completion of the polymerization of butadiene, an n-hexane solution containing 20 parts by weight of styrene (styrene concentration, 20% by weight) was added to the resulting reaction mixture and polymerization was carried out at about 60° C. for 1 hour to obtain the unmodified block copolymer A-1.

When unmodified block copolymers A-4 and A-5 were prepared, silicon tetrachloride was used as a coupling agent.

2,6-Di-tert-butyl-4-methylphenol (hereinafter often referred to as "BHT") was added as a stabilizer to each of the unmodified block cpolymers shown in Table 1.

TABLE 1

| Unmodified Block Copolymer | Polymer Structure[1] | Styrene Content (% by weight) | Vinyl Content[2] (%) in Butadiene Block | Number Average Molecular Weight |
|---|---|---|---|---|
| A-1 | B—S—B—S | 40 | 42 | 64,000 |
| A-2 | | | | 55,000 |
| A-3 | S—B—S | 30 | 38 | 75,000 |
| A-4 | Si—(B—S)$_4$ | 30 | 48 | 164,000 |
| A-5 | Si—(B—S)$_4$ | 70 | 53 | 105,000 |
| A-6 | S—B'—S | 80 | 36 | 120,000 |

Note:
[1] B stands for a butadiene polymer block, B' stands for a butadiene-styrene random copolymer block, and S stands for a styrene polymer block.
[2] The vinyl content was measured using a nuclear magnetic resonance apparatus.

(2) Preparation of Hydrogenated Block Copolymers:

The unmodified block copolymer shown in Table 1 was put in an n-hexane/cyclohexane mixed solvent or a cyclohexane solvent, and hydrogenation was carried out at 50° C. under a hydrogen pressure of 7 Kg/cm$^2$ for 5 hours using cobalt naphthenate and triethyl aluminum as catalysts, whereby there was obtained a selectively hydrogenated block copolymer in which about 90% of double bonds of the butadiene block were hydrogenated but benzene rings of the styrene block were scarcely hydrogenated. The metals of the catalyst residue were removed by washing with an aqueous solution of hydrochloric acid and methanol.

The hydrogenated block copolymers obtained by thus hydrogenating the unmodified block copolymers A-1 through A-6 shown in Table 1 are designated as hydrogenated block copolymers B-1 through B-6, respectively.

(3) Preparation of Modified Hydrogenated Block Copolymers:

To 100 parts by weight of the so-obtained hydrogenated block copolymer was added 1 to 5 parts by weight of maleic anhydride so that a desired amount of maleic anhydride was added to the hydrogenated block copolymer, and 0.1 part by weight of Perhexa 25B [the trade name of 2,5-dimethyl-2,5-di(t-butylperoxy)hexane manufactured and sold by Nippon Yushi K. K., Japan] was added to the mixture, and the mixture was homogeneously blended and supplied to a single screw extruder having a diameter of 20 mm [length/diameter ratio (hereinafter often referred to as "L/D")=24]. The maleinization reaction was carried out at a cylinder temperature of 250° C. to prepare a modified copolymer. Unreacted maleic anhydride was removed from the modified hydrogenated block copolymer by heating under reduced pressure, and BHT was added as a stabilizer in an amount of 0.5 part by weight per 100 parts by weight of the modified copolymer. Thus, modified hydrogenated block copolymers shown in Table 2 were prepared. The analysis values of the obtained modified hydrogenated block copolymer are shown in Table 2. The modified hydrogenated block copolymers obtained by hydrogenating and modifying the unmodified block copolymers A-1, A-2, A-4, A-5 and A-6 shown in Table 1 are designated as modified hydrogenated block copolymers C-1, C-2, C-5, C-6 and C-7, respectively. The modified hydrogenated block copolymers obtained by hydrogenating the unmodified block copolymer A-3 and modifying the hydrogenated block copolymer so that the amounts of maleic anhydride grafted onto the hydrogenated block copolymer were 1.2% by weight and 0.7% by weight are designated as modified hydrogenated block copolymers C-3 and C-4, respectively.

TABLE 2

| Modified Hydrogenated Block Copolymer | Polymer before Hydrogenation | Amount of[*3] Maleic Anhydride Grafted onto Hydrogenated Block Copolymer (% by weight) | Toluene-Insoluble Component Content (% by weight) |
|---|---|---|---|
| C-1 | A-1 | 1.4 | 0.04 |
| C-2 | A-2 | 1.8 | 0.04 |
| C-3 | A-3 | 1.2 | 0.04 |
| C-4 |  | 0.7 | 0.05 |
| C-5 | A-4 | 2.3 | 0.05 |
| C-6 | A-5 | 1.2 | 0.02 |
| C-7 | A-6 | 0.5 | 0.01 |

Note:
[*3] The amount of maleic anhydride grafted onto the hydrogenated block copolymer was measured by the neutralization titration method using sodium methylate.

(4) Preparation of Modified Unhydrogenated Block Copolymers:

Modified unhydrogenated block copolymers D-1, D-2, and D-3 were prepared by grafting maleic anhydride onto the unmodified block copolymers A-2, A-3 and A-5 according to the following procedures.

To 100 parts by weight of the unmodified block copolymer was added to 2 to 5 parts by weight of maleic anhydride so that a desired amount of maleic anhydride was grafted onto the unmodified block copolymer, and 0.3 part by weight of BHT and 0.2 part by weight of phenothiazine were added to the mixture. The mixture was homogeneously blended using a mixer.

The mixture was supplied to a single extruder having a diameter of 20 mm (L/D=24) and the maleinization reaction was carried out at a cylinder temperature of 250° C. to prepare a modified copolymer. Unreacted maleic anhydride was removed from the obtained modified copolymer by drying under reduced pressure. Then, 0.5 part by weight of BHT was added to 100 parts by weight of the modified copolymer. Thus, modified unhydrogenated block copolymers shown in Table 3 were prepared. The analysis values of the obtained modified unhydrogenated polymers are shown in Table 3.

TABLE 3

| Modified Unhydrogenated Block Copolymer | Polymer before Modification | Amount of Maleic Anhydride Grafted onto Unmodified Block Copolymer (% by weight) |
|---|---|---|
| D-1 | A-2 | 1.8 |
| D-2 | A-3 | 0.7 |
| D-3 | A-5 | 1.2 |

(5) Preparation of Ionically Crosslinked Modified Block Copolymer:

Ionically crosslinked modified block copolymers E-1 through E-4 were obtained according to a recipe shown in Table 4. When the ionic crosslinking was carried out in a solvent, the solvent was removed by heating after the crosslinking reaction. By the infrared spectrum, it was confirmed that the acid anhydride groups in the samples E-1 through E-4 were ionized.

TABLE 4

| Conditions | Ionically Crosslinked Modified Block Copolymer | | | |
|---|---|---|---|---|
|  | E-1 | E-2 | E-3 | E-4 |
| Ionic Crosslinking Reaction |  |  |  |  |
| Modified Hydrogenated Block Copolymer | C-2 | C-5 | C-6 | C-7 |
| Crosslinking agent |  |  |  |  |
| Kind | CH$_3$ONa | Mg(OH)$_2$ | Al(OH)$_3$ | KOH |
| Amount (parts by weight)[*4] | 0.5 | 0.7 | 0.5 | 0.1 |
| Crosslinking agent/Acid Anhydride Molar Ratio | 0.5 | 0.5 | 0.5 | 0.25 |
| Crosslinking Reaction Method | in toluene solution, 20 wt. % polymer concentration, room temperature, 1 hour | in molten state, mixing roll, 160° C., 15 minutes | in molten state, Brabender Plastograph, 200° C., 5 minutes | in molten state, Brabender Plastograph, 200° C., 5 minutes |

Note:
[*4] The amount added per 100 parts by weight of the modified hydrogenated block copolymer.

EXAMPLES 1 AND 2 AND COMPARATIVE EXAMPLES 1 AND 2

A resinous composition was obtained by mixing 80 parts by weight of nylon 6 (number average molecular weight: 18,000) as the polar thermoplastic polymer with 20 parts by weight of the modified hydrogenated block copolymer C-1 shown in Table 2 by means of a screw type extruder having a diameter of 30 mm (twin, L/D=28).

Another resinous composition was obtained in the same manner as described above except that the modified block copolymer C-2 was used instead of the modified hydrogenated block copolymer C-1.

For a comparison, a comparative resinous composition was obtained in the same manner as described above except that the unmodified block copolymer A-1 shown in Table 1 was used instead of the modified hydrogenated block copolymer C-1 or C-2.

Another comparative resinous composition was obtained in the same manner as described above except that the unmodified block copolymer A-3 was used instead of the modified hydrogenated copolymer C-1 or C-2 or the unmodified block copolymer A-1.

Test pieces were prepared of the so-obtained resinous compositions by injection molding, and the physical properties of the test pieces were measured. The obtained results are shown in Table 5.

As will be readily understood from the results shown in Table 5, the compositions of the present invention are excellent in compatibility and have a highly improved impact resistance over the comparative compositions.

TABLE 5

|  | Example 1 | Example 2 | Comparative Example 1 | Comparative Example 2 |
|---|---|---|---|---|
| Composition (% by weight) | | | | |
| Modified hydrogenated block copolymer C-1 | 20 | — | — | — |
| Modified hydrogenated block copolymer C-3 | — | 20 | — | — |
| Unmodified block copolymer A-1 | — | — | 20 | — |
| Unmodified block copolymer A-3 | — | — | — | 20 |
| Nylon 6 | 80 | 80 | 80 | 80 |
| Physical properties | | | | |
| Izod impact strength (Kg·cm/cm, notched)*5 | 21.0 | 18.5 | 6.0 | 5.4 |
| Tensile strength (yield point) (Kg/cm$^2$)*6 | 610 | 590 | 450 | 430 |
| Elongation (%)*6 | 115 | 110 | 60 | 56 |
| Transparency (Haze) (%)*7 | 13.2 | 14.5 | 56.0 | 58.5 |

Note:
*5 The Izod impact strength was measured according to ASTM D-256.
*6 The tensile strength and elongation were measured according to ASTM D-638.
*7 The transparency was measured according to JIS K-6714.

EXAMPLE 3 AND COMPARATIVE EXAMPLE 3

A rubbery composition was obtained by kneading 30 parts by weight of nylon 6 (number average molecular weight: 18,000) as a polar thermoplastic polymer with 70 parts by weight of the modified hydrogenated block copolymer C-1 shown in Table 2 for 10 minutes by means of a Brabender Plastograph. Test pieces were prepared of the obtained composition by compression molding, and the physical properties were determined.

For comparison, a comparative rubbery composition was obtained in the same manner as described above except that the unmodified block copolymer A-1 shown in Table 1 was used instead of the modified hydrogenated block copolymer C-1, and test pieces were prepared of the composition and the physical properties were determined.

The obtained results are shown in Table 6.

As will be readily understood from the results shown in Table 6, the composition of the present invention comprising the modified hydrogenated block copolymer and nylon 6 is highly improved in compatibility over the comparative composition, as is proved by the values of the transparency. Moreover, the composition of the present invention has high tensile strength and modulus and is improved in heat resistance represented by the tensile strength at a high temperature. Furthermore, the composition of the present invention is characterized by a highly improved weatherability.

TABLE 6

|  |  | Example 3 | Comparative Example 3 |
|---|---|---|---|
| Composition (parts by weight) | | | |
| Modified hydrogenated block compolymer C-1 | | 70 | — |
| Unmodified block copolymer A-1 | | — | 70 |
| Nylon 6 | | 30 | 30 |
| Physical properties | | | |
| 25° C. | Hardness*8 | 94 | 93 |
|  | Tensile strength*8 (breaking point) (Kg/cm$^2$) | 195 | 78 |
|  | 300% Modulus*8 (Kg/cm$^2$) | 175 | 70 |
|  | Elongation*8 | 400 | 330 |
| 50° C. | Tensile strength*8 (breaking point) (Kg/cm$^2$) | 100 | 30 |
| 70° C. | Tensile strength*8 (breaking point) (Kg/cm$^2$) | 70 | 12 |
| Oil resistance*9 (volume increase ratio) (%) (oil JIS No. 3, 23° C., 22 hours) | | 23 | 45 |
| Transparency (Haze) (%) | | 15 | 65 |
| Weatherability (%)*10 (strength retention after 100 hours' exposure in weatherometer) | | 96 | 34 |

Note:
*8 The hardness, tensile strength, 300% modulus and elongation were measured according to JIS K-6301.
*9 The oil resistance (volume increase ratio) was measured according to JIS K-6310.
*10 The weatherability was evaluated based on the elongation retention, that is, the ratio of the elongation of the test piece after 100 hours' exposure in the weatherometer (XW-WR available from Atlas Co., U.S.A.; light irradiation only) to the elongation of the test piece before the exposure, and was calculated according to the following formula:

Elongation retention (%) (weatherability) = $\frac{\text{elongation after exposure in weatherometer}}{\text{elongation before exposure in weatherometer}} \times 100$

EXAMPLES 4 AND 5 AND COMPARATIVE EXAMPLES 4 AND 5

Resinous compositions were prepared in the same manner as in Examples 1 and 2 and Comparative Examples 1 and 2 except that nylon 66 (number average molecular weight: 20,000) was used instead of nylon 6. In the same manner as in Examples 1 and 2 and Comparative Examples 1 and 2, test pieces were prepared of the obtained compositions and the physical properties were determined. The obtained results are shown in Table 7.

TABLE 7

|  | Example 4 | Example 5 | Comparative Example 4 | Comparative Example 5 |
|---|---|---|---|---|
| Composition (parts by weight) | | | | |
| Modified hydrogenated block copolymer C-1 | 20 | — | — | — |
| Modified hydrogenated block copolymer C-3 | — | 20 | — | — |
| Unmodified block copolymer A-1 | — | — | 20 | — |
| Unmodified block copolymer A-3 | — | — | — | 20 |
| Nylon 66 | 80 | 80 | 80 | 80 |
| Physical properties | | | | |
| Izod impact strength*5 (Kg · cm/cm, notched) | 28 | 24 | 7.6 | 7.0 |
| Tensile strength*6 (yield point) (Kg/cm$^2$) | 660 | 630 | 475 | 460 |
| Elongation*6 (%) | 54 | 51 | 45 | 47 |
| Transparency*7 (Haze) (%) | 14.8 | 15.2 | 58.0 | 61.5 |

Note:
*5, *6, *7 See the Note under Table 5.

EXAMPLES 6 AND 7 AND COMPARATIVE EXAMPLES 6 AND 7

A resinous composition was obtained by mixing 80 parts by weight of PBT 1041 (the trade name for polybutylene terephthalate manufactured and sold by Toray Industries Inc., Japan) as a polar thermoplastic polymer with 20 parts by weight of the modified hydrogenated block copolymer C-1 shown in Table 2 by means of a screw type extruder having a diameter of 30 mm (twin, L/D=28).

Another resinous composition was obtained in the same manner as described above except that the modified hydrogenated block copolymer C-3 was used instead of the modified hydrogenated block copolymer C-1.

For a comparison, a comparative resinous composition was obtained in the same manner as described above except that the unmodified block copolymer A-1 shown in Table 1 was used instead of the modified hydrogenated block copolymer C-1 or C-3.

Another comparative resinous composition was obtained in the same manner as described above except that the unmodified block copolymer A-3 was used instead of the modified hydrogenated block copolymer C-1 or C-3 or the unmodified block copolymer A-1.

Test pieces were prepared of the so-obtained compositions by injection molding, and the physical properties thereof were measured. The obtained results are shown in Table 8.

TABLE 8

|  | Example 6 | Example 7 | Comparative Example 6 | Comparative Example 7 |
|---|---|---|---|---|
| Composition (parts by weight) | | | | |
| Modified hydrogenated block copolymer C-1 | 20 | — | — | — |
| Modified hydrogenated block copolymer C-3 | — | 20 | — | — |
| Unmodified block copolymer A-1 | — | — | 20 | — |
| Unmodified block copolymer A-3 | — | — | — | 20 |
| Polybutylene terephthalate | 80 | 80 | 80 | 80 |
| Physical properties | | | | |
| Izod impact strength*5 (Kg · cm/cm, notched) | 5.2 | 5.6 | 2.4 | 2.3 |
| Tensile strength*6 (yield point) (Kg/cm$^2$) | 514 | 532 | 505 | 500 |
| Elongation*6 (%) | 36 | 30 | 28 | 25 |
| Heat distortion temperature*11 (°C.) (under load of 4.64 Kg/cm$^2$) | 150 | 152 | 152 | 150 |

Note:
*11 The heat distortion temperature was measured according to ASTM D-648.
*5 and *6 See the Note under Table 5.

EXAMPLE 8 AND COMPARATIVE EXAMPLE 8

A polyester prepared from ethylene glycol (diol component), terephthalic acid (dicarboxylic acid component) and isophthalic acid (dicarboxylic acid component) and having a softening point of 195° C. and an intrinsic viscosity of 0.75 (as measured at 35° C. in o-chlorophenol) was used as a polar thermoplastic polymer.

A rubbery composition was obtained by mixing 20 parts by weight of the above-mentioned polyester as a polar thermoplastic polymer with 80 parts by weight of the modified hydrogenated block copolymer C-1 shown in Table 2 by using a screw type extruder having a diameter of 30 mm (twin, L/D=28).

For comparison, a comparative rubbery composition was prepared in the same manner as described above except that the unmodified block copolymer A-1 shown in Table 1 was used instead of the modified hydrogenated block copolymer C-1.

Test pieces were prepared of the so-obtained compositions by compression molding, and the physical properties thereof were determined. The obtained results are shown in Table 9

TABLE 9

|  |  | Example 8 | Comparative Example 8 |
|---|---|---|---|
| Composition (parts by weight) | | | |
| Modified hydrogenated block compolymer C-1 | | 80 | — |
| Unmodified block copolymer A-1 | | — | 80 |
| Polyester | | 20 | 20 |
| Physical properties | | | |
| 25° C. | Hardness*8 | 94 | 92 |
|  | 300% modulus*8 (Kg/cm$^2$) | 113 | 94 |
|  | Tensile strength*8 (breaking point) (Kg/cm$^2$) | 280 | 202 |
|  | Elongation*8 (%) | 534 | 420 |
|  | Oil resistance*9 (%) (volume increase) (oil JIS No. 3, 22 hours) | 26 | 48 |
| 50° C. | Tensile strength*8 (breaking point) (Kg/cm$^2$) | 182 | 105 |
|  | Tensile strength retention | 65 | 52 |

TABLE 9-continued

|  | Example 8 | Comparative Example 8 |
|---|---|---|
| (%)*29 | | |

Note:
*8 and *9 See the Note under Table 6.
*29 Tensile strength retention (%) = $\frac{\text{tensile strength at 50° C.}}{\text{tensile strength at 25° C.}} \times 100$ (%)

As will be readily understood from the results shown in Table 9, the composition of Example 8 comprising the modified hydrogenated block copolymer and the polyester is excellent over the composition of Comparative Example 8 comprising the unmodified block copolymer and the polyester in mechanical properties such as the tensile strength and 300% modulus, the oil resistance and the heat resistance represented by the tensile strength retention at 50° C., and the composition of the present invention is a very valuable material.

EXAMPLES 9 THROUGH 11 AND COMPARATIVE EXAMPLES 9 AND 10

A resinous composition was obtained by mixing and kneading EVAL EP-E [the trade name for an ethylene-vinyl alcohol copolymer, obtained by saponifying an ethylene-vinyl acetate copolymer, manufactured and sold by Kuraray Co., Ltd., Japan] with the modified hydrogenated block copolymer C-1 shown in Table 2 at a mixing ratio shown in Table 10 by means of a mixing roller.

Another resinous composition was obtained by mixing and kneading 75 parts by weight of EVAL EP-E with 25 parts by weight of the modified hydrogenated block copolymer C-3 by means of a mixing roller.

A comparative resinous composition was obtained by mixing and kneading 75 parts by weight of EVAL EP-E with 25 parts by weight of the unmodified block copolymer A-1 shown in Table 1 by means of a mixing roll.

Another comparative resinous composition was obtained in the same manner as described above except that the unmodified block copolymer A-3 shown in Table 1 was used instead of the unmodified block copolymer A-1.

Test pieces were prepared of the so-obtained compositions by compression molding, and the physical properties thereof were determined. The obtained results are shown in Table 10. Furthermore, the adhesion of each composition to high density polyethylene was determined. The obtained results are also shown in Table 10.

TABLE 10

|  | Example 9 | Example 10 | Example 11 | Comparative Example 9 | Comparative Example 10 |
|---|---|---|---|---|---|
| Composition (parts by weight) | | | | | |
| Modified hydrogenated block copolymer C-1 | 25 | 10 | — | — | — |
| Modified hydrogenated block copolymer C-3 | — | — | 25 | — | — |
| Unmodified block copolymer A-1 | — | — | — | 25 | — |
| Unmodified block copolymer A-3 | — | — | — | — | 25 |
| EVAL EP-E | 75 | 90 | 75 | 75 | 75 |
| Physical properties | | | | | |
| Melt index (200° C., 5 Kg load) (g/10 min) | 5.1 | 9.6 | 6.8 | 24.8 | 25.6 |
| Izod impact strength*5 (Kg · cm/cm, notched) | 82.5 | 12.0 | 11.1 | 3.4 | 3.6 |
| Tensile strength*6 (yield point) (Kg/cm²) | 330 | 420 | 382 | 340 | 356 |
| Tensile strength*8 (breaking point) (Kg/cm²) | 270 | 318 | 306 | 314 | 320 |
| Elongation (%)*8 | 58 | 75 | 63 | 24 | 21 |
| Adhesion to high density polyethylene*12 (T-peeling strength) (Kg/25 mm) | 3.0 | 1.6 | 2.1 | 0.3 | 0.2 |

Note:
*5 and *6 See the Note under Table 5.
*8 See the Note under Table 6.
*12 The adhesion to high density polyethylene was determined according to JIS K-6854.

As will be readily understood from the results shown in Table 10, the composition of Example 9 comprising the modified hydrogenated block copolymer has a tensile strength (yield point) substantially comparable to that of the composition of Comparative Example 9 comprising the corresponding unmodified block copolymer, but the notched Izod impact strength of the composition of Example 9 is extremely improved over that of the comparative composition.

When the samples of the compositions of Example 9 and Comparative Example 9 were observed by a phase contrast microscope, it was found that in the sample of Example 9, the modified block copolymer is uniformly dispersed in the form of particles having a size of about 0.5 to about 2µ in the matrix of the ethylene-vinyl alcohol copolymer, wherease in the sample of Comparative Example 9, unmodified block copolymer particles having a size of about 5 to about 10µ or larger are dispersed. Accordingly, it has been confirmed that there is a distinct difference of the compatibility between the two samples.

Furthermore, it has been confirmed that the composition of the present invention has an improved adhesion to polyethylene.

EXAMPLES 12 AND 13 AND COMPARATIVE EXAMPLES 11 AND 12

Each composition shown in Table 11 was prepared by using a mixing roller. Thes pieces were prepared of the obtained composition by compression molding. The physical properties thereof were determined. The obtained results are shown in Table 11.

sured according to JIS K-6854. The obtained results are shown in Table 12.

TABLE 12

|  | Example 14 | Example 15 | Example 16 | Comparative Example 13 | Comparative Example 14 | Comparative Example 15 |
|---|---|---|---|---|---|---|
| Composition (parts by weight) | | | | | | |
| Modified hydrogenated block copolymer C-1 | 10 | 60 | 90 | — | — | — |
| Unmodified block copolymer A-1 | — | — | — | 10 | 60 | 90 |
| Polyurethane (Paraplene P-22 SM) | 90 | 40 | 10 | 90 | 40 | 10 |
| Adhesion to polyvinyl chloride (90° peeling strength) (Kg/25 mm) | 9.2 | 8.9 | 6.0 | 8.0 | 2.8 | 0.9 |
| Adhesion to polyethylene (180° peeling strength) (Kg/25 mm) | 8.3 | 12.1 | 13.0 | 1.2 | 2.0 | 3.7 |

TABLE 11

|  | Example 12 | Example 13 | Comparative Example 11 | Comparative Example 12 |
|---|---|---|---|---|
| Composition (parts by weight) | | | | |
| Modified hydrogenated block copolymer C-1 | 75 | 90 | — | — |
| Unmodified block copolymer A-1 | — | — | 75 | 90 |
| EVAL EP-E | 25 | 10 | 25 | 10 |
| Physical properties | | | | |
| Melt index (200° C., 5 Kg load) (g/10 min) | 5.7 | 2.8 | 17.0 | 13.5 |
| Hardness*8 | 89 | 87 | 87 | 87 |
| 300% modulus*8 (Kg/cm²) | 86 | 82 | 44 | 31 |
| Tensile strength*8 (breaking point) (Kg/cm²) | 196 | 205 | 178 | 190 |
| Oil resistance*30 (weight increase %) (oil JIS No. 3, 24 hours' dipping) | 23 | 48 | 53 | 54 |
| Adhesion to high density polyethylene*12 (T-peeling strength) (Kg/25 mm) | 7.4 | 6.2 | 1.6 | 1.7 |

Note:
*8See the Note under Table 6.
*12See the Note under Table 10.
*30The oil resistance was determined according to JIS K-6310.

As will be readily understood from the results shown in Table 11, the modulus of the composition of the present invention is highly improved and the oil resistance is remarkably improved by addition of a small amount of the ethylene-vinyl alcohol copolymer. Moreover, the adhesion to polyethylene is improved with respect to the composition of the present invention.

EXAMPLES 14 THROUGH 16 and COMPARATIVE EXAMPLES 13 THROUGH 15

Compositions of the present invention and comparative compositions were obtained by mixing Paraplene P-22 SM (the trade name for a thermoplastic polyurethane manufactured and sold by Nippon Polyurethane Co., Ltd., Japan) as a polar thermoplastic polymer according to the recipe shown in Table 12 by means of a Brabender Plastograph.

Each of the obtained compositions was press-bonded at 180° C. to polyvinyl chloride sheet or a high density polyethylene sheet and the peeling strength was mea- As will be readily understood from the results shown in Table 12, the composition of the present invention has excellent adhesion characteristics to polyvinyl chloride and polyethylene sheets within a broad mixing ratio. In contrast, the adhesiveness of the comparative composition is inferior to that of the corresponding composition of the present invention.

EXAMPLES 17 AND 18

A mixture obtained by impregnating 100 parts by weight of the hydrogenated block copolymer B-1 used for formation of the modified hydrogenated block copolymer C-1 shown in Table 2 (obtained by hydrogenating the unmodified block copolymer A-1 shown in Table 1) with 2.5 parts by weight of acrylic acid was homogeneously mixed with 0.1 part by weight of Perhexa 25B [the trade name of 2,5-dimethyl-2,5-di(tert-butylperoxy)hexane available from Nippon Yushi K.K., Japan]. The obtained mixture was supplied into a screw type extruder having a diameter of 20 mm (single, L/D=24) and the reaction was carried out at a cylinder temperature of 210° C. to modify the hydrogenated block copolymer B-1. Unreacted acrylic acid was removed from the obtained modified hydrogenated block copolymer by heating under reduced pressure. Then, BHT was added as a stabilizer in an amount of 0.5 part by weight per 100 parts by weight of the obtained polymer. The so-obtained modified hydrogenated block copolymer is designated as "F-1".

A modified hydrogenated block copolymer was prepared in the same manner as described above except that the hydrogenated block copolymer B-3 used for formation of the modified hydrogenated block copolymer C-3 (obtained by hydrogenating the unmodified block copolymer A-3 shown in Table 1) was used instead of the hydrogenated block copolymer B-1. The obtained modified hydrogenated block copolymer is designated as "F-2".

The analysis values of the so-obtained modified hydrogenated block copolymers are shown in Table 13.

TABLE 13

| Modified hydrogenated block copolymer | Polymer before hydrogenation | Amount (% by weight) of acrylic acid grafted onto hydrogenated block copolymer | Melt index (200° C., 5 Kg load) | Toluene-insoluble component content (% by weight) |
|---|---|---|---|---|
| F-1 | A-1 | 2.05 | 1.1 | 0.05 |

TABLE 13-continued

| Modified hydrogenated block copolymer | Polymer before hydrogenation | Amount (% by weight) of acrylic acid grafted onto hydrogenated block copolymer | Melt index (200° C., 5 Kg load) | Toluene-insoluble component content (% by weight) |
|---|---|---|---|---|
| F-2 | A-3 | 1.87 | 0.9 | 0.05 |

The amount of grafted onto the hydrogenated block copolymer was measured by the neutralizing titration method using sodium methylate.

A resinous composition was obtained in the same manner as described in Examples 4 and 5 except that F-1 was used as the modified hydrogenated block copolymer.

Another resinous composition was obtained in the same manner as descirbed above except that F-2 was used as the modified hydrogenated block copolymer.

In the same manner as described in Examples 4 and 5, test pieces were prepared of the so-obtained compositions, and the physical properties thereof were measured. The obtained results are shown in Table 14.

TABLE 14

|  | Example 17 | Example 18 |
|---|---|---|
| Composition (parts by weight) | | |
| Modified hydrogenated block copolymer F-1 | 20 | — |
| Modified hydrogenated block copolymer F-2 | — | 20 |
| Nylon 66 | 80 | 80 |
| Physical properties | | |
| Izod impact strength*5 (Kg · cm/cm, notched) | 32 | 29 |
| Tensile strength*6 (yield point) (Kg/cm²) | 670 | 650 |
| Elongation*6 (%) | 50 | 49 |
| Transparency*7 (Haze) (%) | 17.3 | 19.1 |

Note:
*5, *6 and *7 See the Note under Table 5.

As will readily be understood from the results shown in Table 14, the compositions of the present invention comprising modified hydrogenated block copolymers have improved impact strengths as compared with the compositions of Comparative Examples 4 and 5 (see Table 7).

EXAMPLES 19 AND 20 AND COMPARATIVE EXAMPLES 16 THROUGH 21

Compositions were prepared by mixing block copolymers shown in Table 15 with the same nylon 66 as used in Examples 4 and 5 or the same EVAL EP-E as used in Examples 9 through 11, and the Izod impact strength was measured and the weatherability test and the heat aging resistance test were carried out.

It was confirmed that the compositions of the present invention are excellent in impact resistance, weatherability and resistance to heat aging.

TABLE 15

|  |  | Example 19 | Comparative Example 16 | Comparative Example 17 | Comparative Example 18 | Example 20 | Comparative Example 19 | Comparative Example 20 | Comparative Example 21 |
|---|---|---|---|---|---|---|---|---|---|
| Composition (parts by weight) | | | | | | | | | |
| Block Copolymer | Kind | C-3 | A-3 | B-3 | D-2 | C-2 | A-2 | B-2 | D-1 |
|  | Amount |  | 20 |  |  |  | 25 |  |  |
| Thermoplastic Resin | Kind |  | nylon 66 | | |  | EVAL EP-E | | |
|  | Amount |  | 80 | | |  | 75 | | |
| Izod Impact Strength*5 (Kg · cm/cm, Notched) | | 24 | 7.0 | 8.1 | 22 | 85 | 3.4 | 3.9 | 82 |
| Weatherability*13 (%) | | 72 | 42 | 71 | 45 | 83 | 54 | 80 | 59 |
| Heat aging Resistance*14 (%) | | 80 | 51 | 78 | 55 | 77 | 48 | 75 | 51 |

Note:
*5See the Note under Table 5.
*13Before and after 500 hours' exposure (light irradiation only) in a weatherometer (XW-WR available from Atlas Co., U.S.A.), the Izod impact strength (unnotched) of the test pieces was measured, and the weatherability was evaluated based on the Izod impact strength retention after the exposure in the weatherometer, which was calculated according to the following formula:

Izod impact strength retention (weatherability) (%) = 
$$\frac{\text{Izod impact strength after exposure in weatherometer}}{\text{Izod impact strength before exposure in weatherometer}} \times 100$$

*14Before and after standing in air at 100° C. for one month, the Izod impact strength (unnotched) of the test pieces was measured, and the resistance to thermal deterioration was evaluated based on the Izod impact strength retention, which was calculated according to the following formula:

Izod impact strength retention (heat aging resistance) (%) = 
$$\frac{\text{Izod impact strength after standing at 100° C.}}{\text{Izod impact strength before standing at 100° C.}} \times 100$$

EXAMPLE 21 AND COMPARATIVE EXAMPLE 22

A modified hydrogenated block copolymer C-1' having maleic anhydride grafted onto the hydrogenated block copolymer in an amount of 4.1% by weight was prepared in the same manner as adopted for the production of the modified hydrogenated block copolymer C-1 except that 7 parts by weight of maleic anhydride was incorporated into 100 parts by weight of the hydrogenated block copolymer B-1 (obtained by hydrogenating the unmodified block copolymer A-1 shown in Table 1).

A modified ethylene-propylene copolymer rubber G-1 was prepared in the same manner as described above except that JSR EP57P (the trade name of an ethylene-propylene copolymer rubber manufactured and sold by Nippon Gosei Gomu K.K., Japan) was used instead of the hydrogenated block copolymer B-1. The amount of maleic anhydride grafted was 3.0% by weight.

A resinous composition was obtained by mixing 20 parts by weight of the so-obtained modified hydrogenated block copolymer C-1' with 80 parts by weight of the same nylon-66 as used in Examples 4 and 5 by means of a screw type extruder having a diameter of 30 mm (twin, L/D=28).

A comparative resinous composition was obtained in the same manner as described above except that the modified ethylene-propylene copolymer rubber G-1 as prepared above was used instead of the modified hydrogenated block copolymer C-1'.

Test pieces were prepared of the obtained compositions by injection molding, and the physical properties thereof were determined. Furthermore, test pieces having a thickness of 0.5 mm were prepared of the compositions, and the transparency was measured. The obtained results are shown in Table 16. From the results shown in Table 16, it is apparent that the composition of the present invention is excellent in transparency and impact resistance.

TABLE 16

|  | Example 21 | Comparative Example 22 |
|---|---|---|
| Composition (parts by weight) | | |
| Modofied hydrogenated block copolymer C-1' | 20 | — |
| Modified ethylene-propylene copolymer rubber G-1 | — | 20 |
| Nylon 66 | 80 | 80 |
| Physical properties | | |
| Izod impact strength*5 (Kg · cm/cm, notched) | 75 | 68 |
| Tensile strength*6 (yield point) (Kg/cm²) | 630 | 635 |
| Elongation (%)*6 | 35 | 30 |
| Transparency (Haze) (%)*7 | 23.1 | 38.5 |

Note:
*5, *6 and *7 See the Note under Table 5.

EXAMPLES 22 THROUGH 27 AND COMPARATIVE EXAMPLES 23 THROUGH 26

Compositions comprising Surlyn A-1706 (the trade name of a partially metal-crosslinked ethylene-acrylic acid copolymer available from Du Pont Co., U.S.A.) as the component (a) were prepared by mixing according to the recipe shown in Table 17 by means of rollers. The physical properties of the test pieces prepared from these compositions by compression molding are shown in Table 17.

As will be readily understood from the results shown in Table 17, the composition of the present invention is improved over the comparative compositions in tensile strength and oil resistance. Incidentally, in Examples 22 through 27, it was confirmed by an infrared spectrophotometer that the acid anhydride groups in the modified block copolymer participated in the ionic crosslinking.

Then, the adhesion of each composition to an aluminum plate was examined. It was found that the compositions of the present invention are excellent over the comparative compositions in adhesive properties. The compositions of the present invention have a good adhesion even after immersion in water, and this is a great characteristic not possessed by the comparative compositions.

TABLE 17

|  |  | Example No. |  |  |  |  |  | Comparative Example No. |  |  |  |
|---|---|---|---|---|---|---|---|---|---|---|---|
|  |  | 22 | 23 | 24 | 25 | 26 | 27 | 23 | 24 | 25 | 26 |
| Composition | | | | | | | | | | | |
| Component (a) | Amount (% by weight) | 30 | 20 | 10 | 30 | 20 | 10 | 30 | 20 | 10 | — |
| Component (b) | Kind | C-2 | C-2 | C-5 | E-1 | E-1 | E-2 | B-2 | B-2 | B-4 | B-2 |
|  | Amount (% by weight) | 70 | 80 | 90 | 70 | 80 | 90 | 70 | 80 | 90 | 100 |
| Physical Properties | | | | | | | | | | | |
| 300% Modulus*8 (Kg/cm²) |  | 64 | 57 | 55 | 70 | 65 | 60 | 51 | 45 | 44 | 35 |
| Tensile strength*8 (breaking point) (Kg/cm²) |  | 205 | 187 | 243 | 230 | 213 | 255 | 153 | 167 | 210 | 180 |
| Oil resistance*28 (weight increase) (%) |  | 13 | 18 | 30 | 10 | 15 | 25 | 42 | 51 | 72 | 60 |
| Adhesion to aluminum plate*31 (peeling strength) (Kg/25 mm) | Before Immersion in Water | 21.0 | 17.3 | 28.5 | 23.6 | 19.5 | 33.1 | 1.8 | 1.3 | 0.9 | 0.5 |
|  | After Immersion in Water | 6.3 | 5.2 | 8.4 | 7.1 | 5.7 | 9.8 | 0.2 | 0.2 | 0.1 | 0.1 |

Note:
*8See the Note under Table 6.
*28See the Note under Table 11.
*31The adhesion was measured under the following conditions according to the following method.
Measurement method: JIS K-6854
Bonding conditions: temperature of 200° C., compression pressure of 20 Kg/cm²
Immersion conditions: room temperature (about 20° C.), 24 hours, in water

EXAMPLES 28 THROUGH 33 AND COMPARATIVE EXAMPLES 27 THROUGH 30

Compositions comprising Copolene QD-400 (the trade name of a partially metal-crosslinked ethylene-acrylic acid copolymer manufactured and sold by Asahi Dow Co., Japan) as the component (a) were obtained by mixing according to the recipe shown in Table 18 by means of mixing rolls. The physical properties of the test pieces prepared of the obtained compositions by compression molding are shown in Table 18. Then, the adhesion of each composition to nylon (undrawn sheet of nylon 6) was examined. The obtained results are shown in Table 18.

From the results shown in Table 18, it is apparent that the compositions of the present invention are excellent over the comparative compositions in tensile strength and adhesiveness.

TABLE 18

|  | Example No. |  |  |  |  |  | Comparative Example No. |  |  |
|---|---|---|---|---|---|---|---|---|---|
|  | 28 | 29 | 30 | 31 | 32 | 33 | 27 | 28 | 29 |
| Composition | | | | | | | | | |

TABLE 18-continued

|  |  | Example No. |  |  |  |  |  | Comparative Example No. |  |  |
|---|---|---|---|---|---|---|---|---|---|---|
|  |  | 28 | 29 | 30 | 31 | 32 | 33 | 27 | 28 | 29 |
| Component (a) | Amount (% by weight) | 80 | 70 | 60 | 80 | 70 | 60 | 80 | 70 | 60 |
| Component (b) | Kind | C-5 | C-6 | C-2 | E-2 | E-3 | E-1 | A-4 | A-5 | A-2 |
|  | Amount (% by weight) | 20 | 30 | 40 | 20 | 30 | 40 | 20 | 30 | 40 |
| Physical Properties |  |  |  |  |  |  |  |  |  |  |
| Tensile Strength*[6] (yield point) (Kg/cm²) |  | 270 | 250 | 220 | 285 | 265 | 235 | 245 | 230 | 200 |
| Adhesion to nylon sheet*[32] (peeling strength) (Kg/25 mm) | Before Immersion in Water | 5.1 | 3.7 | 7.0 | 6.5 | 4.6 | 9.4 | 1.2 | 1.0 | 1.1 |
|  | After Immersion in Water | 3.4 | 2.8 | 5.4 | 4.7 | 3.1 | 6.2 | 0.2 | 0.1 | 0.1 |

Note:
*[6] See the Note under Table 5.
*[32] The adhesion was measured under the following conditions according to the following method.
Measurement method: JIS K-6854
Bonding conditions: temperature of 200° C., compression pressure of 20 Kg/cm²
Immersion conditions: room temperature (about 20° C.), 24 hours, in water

EXAMPLES 34 THROUGH 43 AND COMPARATIVE EXAMPLES 30 THROUGH 41

Compositions comprising a thermoplastic polymer and a block copolymer, as shown in Table 19, were prepared. More specifically, 100 parts by weight of a thermoplastic polymer was sufficiently mixed with 10 parts by weight of a block copolymer by a Henschel mixer, and the mixture was pelletized by a screw type extruder having a diameter of 40 mm (single, L/D=28). A flat plate having a size of 120 mm×120 mm×3 mm was prepared from the pelletized composition by injection molding. The obtained flat plate was degreased with methyl alcohol, spray-coated with Acryca B160 (the trade name of an acrylic resin paint available from Kawakami Toryo K.K., Japan), and naturally dried. In case of the composition comprising a polyoxymethylene or nitrile resin as the thermoplastic polymer, the plate was, instead of being degreased with methyl alcohol, immersed in a 0.1N hydrochloric acid solution for 30 seconds and spray-washed with water.

Each resulting plate was subjected to the paint adhesion test. The obtained results are shown in Table 19. As is apparent from the results shown in Table 19, the compositions of the present invention are excellent in paint adhesion.

TABLE 19

|  | Kind of Block Copolymer | Kind of Thermoplastic Polymer*[15] | Paint Adhesion*[19] |
|---|---|---|---|
| Example 34 | modified hydrogenated block copolymer C-2 | PO |  |
| Example 35 | modified hydrogenated block copolymer C-2 | PC | ⊚ |
| Example 36 | modified hydrogenated block copolymer C-2 | PS | ⊚ |
| Example 37 | modified hydrogenated block copolymer C-2 | NR | ○ |
| Example 38 | modified hydrogenated block copolymer C-2 | PPE | ⊚ |
| Example 39 | modified hydrogenated block copolymer C-2 | GPPE | ⊚ |
| Example 40 | modified hydrogenated block copolymer C-2 | PPS | ⊚ |
| Example 41 | modified hydrogenated block copolymer C-2 | PC + PET*[16] | ○ |
| Example 42 | modified hydrogenated block copolymer C-2 | PS + PA*[17] | ○ |
| Example 43 | modified hydrogenated block copolymer C-2 | PO + TPET*[18] | ○ |
| Comparative Example 30 | unmodified block copolymer A-2 | PO | × |
| Comparative Example 31 | unmodified block copolymer A-2 | PC | △ |
| Comparative Example 32 | unmodified block copolymer A-2 | PS | △ |
| Comparative Example 33 | unmodified block copolymer A-2 | NR | × |
| Comparative Example 34 | unmodified block copolymer A-2 | PPE | ○ |
| Comparative Example 35 | unmodified block copolymer A-2 | PPS | △ |
| Comparative Example 36 | hydrogenated block copolymer B-2 | PO | × |
| Comparative Example 37 | hydrogenated block copolymer B-2 | PC | △ |
| Comparative Example 38 | hydrogenated block copolymer B-2 | PS | △ |
| Comparative Example 39 | hydrogenated block copolymer B-2 | NR | × |
| Comparative Example 40 | hydrogenated block copolymer B-2 | PPE | ○ |
| Comparative Example 41 | hydrogenated block copolymer B-2 | PPS | △ |

Note:
*[15] The thermoplastic polymers used are as follows (PS, PPE and PPS are products of companies in U.S.A. and other resins are products of Japanese companies):

| Abbreviation | Thermplastic Polymer | Maker | Trade name |
|---|---|---|---|
| PC | polycarbonate | Teijin Kasei | Panlite L-1225 |
| PS | polysulfone | ICI | Polyether Sulfone 200P |
| PPE | polyphenylene ether | General Electric | Noryl 701 |
| GPPE | styrene-grafted | Asahi-Dow | Xylon 500H |

TABLE 19-continued

| | | | |
|---|---|---|---|
| PPS | polyphenylene ether polyphenylene sulfide | Phillips Petroleum | Ryton R-6 |
| PBT | polybutylene terephthalate | Toray | PBT 1041 |
| TPET | thermoplastic polyester | Toyobo | Pelprene P150B |
| PA | polyamide | Toray | Amilan CM-1017 |
| ABS | acrylonitrile-butadiene styrene copolymer | Asahi-Dow | Stylac 181 |
| HIPS | impact-resistant rubber modified polystyrene | Asahi-Dow | Styron 492 |

PO: polyoxymethylene (polyoxymethylene diacetate having a melt index of about 10 g/10 min as measured at 210° C. under a load of 2.16 kg was used)
NR: nitrile resin [acrylonitrile/styrene (90/10) copolymer having a melt index of about 1 g/10 min as measured at 190° C. under a load of 12.5 kg was used]
*[16] A mixture of PC/PET (2/1 weight ratio) was used as the thermoplastic polymer.
*[17] A mixture of PS/PA (2/1 weight ratio) was used as the thermoplastic polymer.
*[18] A mixture of PO/TPET (4/1 weight ratio) was used as thermoplastic polymer.
*[19] Eleven cut lines having an interval of 1 mm were formed with a knife on the coated surface of the flat plate in both the longitudinal direction and the lateral direction to form 100 cut squares. A pressure sensitive adhesion cellophane tape was applied to the coated surface and the tape was peeled off in the vertical direction. The adhesiveness was evaluated based on the number of cut squares peeled together with the tape.
◎: up to 10 of peeled squares
○: 11 to 20 of peeled squares
△: 21 to 40 of peeled squares
×: 41 or more of peeled squares

EXAMPLES 44 THROUGH 47 AND COMPARATIVE EXAMPLES 42 THROUGH 53

Compositions comprising a thermoplastic polymer and a block copolymer, shown in Table 20, were prepared in the following manner. Namely, 100 parts by weight of a thermoplastic polymer was mixed with 50 parts by weight of a block copolymer by a screw type extruder having a diameter of 40 mm (single L/D=28) and the mixture was pelletized. Test pieces were prepared of the pelletized composition by injection molding. The Izod impact strength and gloss thereof were measured and the weatherability and heat aging tests were carried out. The obtained results are shown in Table 20. In Table 20, there are also shown the values of the gloss measured for the test pieces of the composition comprising the ionic crosslinking product E-3 of the modified block copolymer C-6, which was used as a block copolymer. From the results shown in Table 20, it is seen that the compositions of the present invention are excellent in weatherability and heat aging resistance as expressed in strength retention.

TABLE 20

| | Block Copolymer | Thermoplastic Polymer | Izod Impact Strength*[5] (Kg·cm/cm, notched) | Gloss*[20] (%) | Weatherability*[21] (%) | Heat Aging Resistance*[14] (%) |
|---|---|---|---|---|---|---|
| Example 44 | modified hydrogenated block copolymer C-6 | PC | 38.6 | 70 (75) | 73 | 78 |
| Example 45 | modified hydrogenated block copolymer C-6 | PS | 10.4 | 61 (68) | 76 | 80 |
| Example 46 | modified hydrogenated block copolymer C-6 | GPPE | 29.5 | 71 (77) | 74 | 87 |
| Example 47 | modified hydrogenated block copolymer C-6 | PPS | 4.6 | 62 (70) | 79 | 85 |
| Comparative Example 42 | unmodified block copolymer A-5 | PC | 29.1 | 63 | 31 | 45 |
| Comparative Example 43 | unmodified block copolymer A-5 | PS | 6.3 | 55 | 34 | 47 |
| Comparative Example 44 | unmodified block copolymer A-5 | GPPE | 24.2 | 66 | 36 | 55 |
| Comparative Example 45 | unmodified block copolymer A-5 | PPS | 2.5 | 57 | 40 | 54 |
| Comparative Example 46 | hydrogenated block copolymer B-5 | PC | 30.0 | 64 | 72 | 76 |
| Comparative Example 47 | hydrogenated block copolymer B-5 | PS | 6.9 | 54 | 74 | 79 |
| Comparative Example 48 | hydrogenated block copolymer B-5 | GPPE | 25.0 | 67 | 74 | 87 |
| Comparative Example 49 | hydrogenated block copolymer B-5 | PPS | 2.8 | 55 | 79 | 85 |
| Comparative Example 50 | modified unhydrogenated block copolymer D-3 | PC | 34.5 | 70 | 32 | 47 |
| Comparative Example 51 | modified unhydrogenated | PS | 8.5 | 60 | 34 | 47 |

TABLE 20-continued

|  | Block Copolymer | Thermoplastic Polymer | Izod Impact Strength[*5] (Kg·cm/cm, notched) | Gloss[*20] (%) | Weatherability[*21] (%) | Heat Aging Resistance[*14] (%) |
|---|---|---|---|---|---|---|
| Comparative Example 52 | block copolymer D-3 modified unhydrogenated block copolymer D-3 | GPPE | 27.0 | 71 | 38 | 56 |
| Comparative Example 53 | modified unhydrogenated block copolymer D-3 | PPS | 3.5 | 60 | 41 | 54 |

Note:
[*5] See the Note under Table 5.
[*14] See the Note under Table 15.
[*20] The gloss was measured according to the method of JIS Z-8741. Each parenthesized value in Table 20 is the value of gloss measured with respect to the composition comprising the ionic crosslinking product E-3 of the modified hydrogenated block copolymer C-6 instead of the copolymer C-6.
[*21] After and before 1000 hours' exposure (light irradiation only) in a weatherometer (XW-WR manufactured and sold by Atlas Co., U.S.A.), the Izod impact strength (unnotched) of test pieces was measured, and the Izod impact retention after the exposure in the weatherometer was calculated according to the following formula:

Izod impact strength retention (weatherability) (%) =
$$\frac{\text{Izod impact strength after exposure in weaterometer}}{\text{Izod impact strength before exposure in weaterometer}} \times 100$$

EXAMPLES 48 THROUGH 51 AND COMPARATIVE EXAMPLES 54 THROUGH 57

Compositions of the present invention and comparative compositions were prepared according to the recipes shown in Table 21 by using a screw type extruder having a diameter of 40 mm (single, L/D=28). Test pieces were prepared of the obtained compositions by injection molding, and the Izod impact strength thereof was measured. The obtained results are shown in Table 21. From the results shown in Table 21, it is seen that the composition of the present invention is excellent in impact resistance. Incidentally, polystyrene having a weight average molecular weight of about 220,000 was used in Example 50 and Comparative Example 56.

about 60%, respectively. The hydrogenated block copolymers were modified according to the same method as adopted for production of the modified hydrogenated block copolymer C-6 to obtain modified hydrogenated block copolymers C-6' and C-6" having a hydrogenation degree different from that of C-6. Compositions comprising the modified hydrogenated block copolymer C-6, the obtained modified hydrogenated block copolymer C-6' or C-6" or the modified unhydrogenated block copolymer D-3 were obtained according to the recipe shown in Table 22 by using a screw type extruder having a diameter of 40 mm (single, L/D=28). Test pieces were prepared of the obtained compositions by injection molding, and the weatherability and heat aging tests were carried out. The obtained results are shown in Table 22.

From the results shown in Table 22, it is seen that when a modified block copolymer prepared from a block copolymer having a hydrogenation degree lower than 80% (an ethylenic unsaturation degree exceeding

TABLE 21

|  | Example No. |  |  |  | Comparative Example No. |  |  |  |
|---|---|---|---|---|---|---|---|---|
|  | 48 | 49 | 50 | 51 | 54 | 55 | 56 | 57 |
| Block Copolymer | | | | | | | | |
| Kind | modified hydrogenated block copolymer C-5 | | | | unmodified block copolymer A-4 | | | |
| Amount (% by weight) | 10 | 20 | 20 | 10 | 10 | 20 | 20 | 10 |
| Thermoplastic polymer[*15] | | | | | | | | |
| First Component | | | | | | | | |
| Kind | PC | PS | GPPE | PPS | PC | PS | GPPE | PPS |
| Amount (% by weight) | 70 | 60 | 65 | 70 | 70 | 60 | 65 | 70 |
| Second Component | | | | | | | | |
| Kind | ABS | HIPS | polystyrene | HIPS | ABS | HIPS | polystyrene | HIPS |
| Amount (% by weight) | 20 | 20 | 15 | 20 | 20 | 20 | 15 | 20 |
| Izod Impact Strength[*5] (Kg·cm/cm, notched) | 46.1 | 19.0 | 35.3 | 16.5 | 35.2 | 13.4 | 29.6 | 10.7 |

Note:
[*5] See the Note under Table 5.
[*15] See the Note under Table 19.

EXAMPLES 52 AND 53 AND COMPARATIVE EXAMPLES 58 AND 59

The unmodified block copolymer A-5 was hydrogenated according to the same method as adopted for production of the hydrogenated block copolymers B-1 through B-6 to obtain two hydrogenated block copolymers having hydrogenation degrees of about 86% and 20%) is used, the weatherability and resistance to heat aging are degraded.

TABLE 22

|  | Example | | Comparative Example | |
| --- | --- | --- | --- | --- |
|  | 52 | 53 | 58 | 59 |
| Unhydrogenated polymer used for formation of modified block copolymer | A-5 | | | |
| Hydrogenation degree (%) | 90 | 86 | 60 | 0 |
| Amount (% by weight) of maleic anhydride grafted onto the block copolymer | 1.2 | 1.3 | 1.3 | 1.2 |
| Composition (parts by weight) | | | | |
| modified block copolymer | C-6 | C-6' | C-6" | D-3 |
| amount | 50 | 50 | 50 | 50 |
| thermoplastic polymer*15 | PC | PC | PC | PC |
| amount | 100 | 100 | 100 | 100 |
| Weatherability*21 (%) | 73 | 70 | 53 | 32 |
| Heat aging resistance*14 (%) | 78 | 71 | 55 | 47 |

Note:
*15See the Note under Table 19.
*21See the Note under Table 20.
*14See the Note under Table 15.

EXAMPLES 54 AND 55

Compositions of the present invention containing a glass fiber were prepared according to the recipe shown in Table 23 by using a screw type extruder having a diameter of 30 mm (twin, L/D=28). Test pieces were prepared of the obtained compositions by injection molding, and the Izod impact strength was measured. The obtained results are shown in Table 23.

TABLE 23

|  | Example 54 | Example 55 |
| --- | --- | --- |
| Composition (parts by weight) | | |
| modified hydrogenated block copolymer C-6 | 30 | — |
| modified hydrogenated block copolymer C-4 | — | 10 |
| thermoplastic polymer PS*15 | 40 | — |
| thermoplastic polymer PPE*15 | — | 70 |
| glass fiber*22 | 30 | 20 |
| Physical property | | |
| Izod impact strength*5 (Kg · cm/cm, notched) | 12.5 | 23.1 |

Note:
*5See the Note under Table 5.
*15See the Note under Table 19.
*22CS 99A-401 (the trade name of a glass fiber manufactured and sold by Nittobo Co., Japan) was used.

EXAMPLES 56 THROUGH 63 AND COMPARATIVE EXAMPLES 60 THROUGH 66

Compositions of the present invention and comparative compositions comprising a block copolymer and a thermoplastic polymer, shown in Table 24, were prepared according to the recipe shown below by using a screw type extruder having a diameter of 30 mm (twin, L/D=28) for kneading.

| Composition Recipe | Amount (parts by weight) |
| --- | --- |
| modified hydrogenated block copolymer C-2 or unmodified block copolymer A-2 | 100 |
| thermoplastic polymer*23 | 50 |
| Shellflex 311 (the trade name of a naphthene type process oil manufactured and sold by Sankyo Yuka Co., Ltd., Japan) | 50 |
| titanium oxide | 1 |
| stablilizer*24 | 0.7 |

Note:
*23A powdery product having a particle size of about 50 mesh, which was obtained by freeze-pulverizing the pelletized thermoplastic polymer, was used.
*242,2'-Methylene-bis(4-methyl-6-tert-butylphenol) was used as the stabilizer.

Test pieces of the obtained compositions were prepared by molding, and the tensile strength, abrasion resistance and compression permanent strain thereof were determined. The obtained results are shown in Table 24.

From the results shown in Table 24, it is seen that the composition of the present invention is excellent over the comparative composition comprising an unmodified block copolymer in tensile strength, abrasion resistance and resistance to compression permanent strain.

According to the method described in the Note *10 under Table 6, the weatherability test was carried out. It was found that the test pieces of the compositions of Examples 56 through 63, after the weatherability test, substantially retained the characteristics and rubbery elasticity, while with respect to the test pieces of the compositions of Comparative Examples 62 through 68, the elongation retention at the tensile test was lower than 30% and the rubbery elasticity was lost, showing considerable deterioration.

TABLE 24

|  | Block Copolymer | Thermoplastic polymer | Tensile*8 Strength (Kg/cm$^2$) | Abrasion Resistance*25 (index) | Compression Permanent Strain (%)*26 | | | |
| --- | --- | --- | --- | --- | --- | --- | --- | --- |
|  |  |  |  |  | 20° C. | 60° C. | 20° C.*27 | 60° C.*27 |
| Example 56 | modified hydrogenated block copolymer C-2 | PO | 128 | 135 | 20 | 33 | 12 | 22 |
| Example 57 | modified hydrogenated block copolymer C-2 | PC | 140 | 150 | 18 | 30 | 10 | 20 |
| Example 58 | modified hydrogenated block copolymer C-2 | PS | 133 | 145 | 17 | 25 | 10 | 12 |
| Example 59 | modified hydrogenated block copolymer C-2 | NR | 125 | 130 | 21 | 32 | 11 | 21 |
| Example 60 | modified hydrogenated block copolymer C-2 | PPE | 140 | 160 | 17 | 27 | 12 | 20 |
| Example 61 | modified hydrogenated block copolymer C-2 | PPS | 137 | 145 | 18 | 26 | 10 | 16 |
| Example 62 | modified hydrogenated block copolymer C-2 | PC + PBT*28 | 131 | 130 | 19 | 32 | 11 | 21 |
| Example 63 | modified hydrogenated block copolymer C-2 | PS + PA*28 | 128 | 130 | 20 | 35 | 13 | 20 |
| Comparative | unmodified | PO | 93 | 80 | 36 | 58 | — | — |

TABLE 24-continued

| | Block Copolymer | Thermoplastic polymer | Tensile[8] Strength (Kg/cm²) | Abrasion Resistance[25] (index) | Compression Permanent Strain (%)[26] | | | |
|---|---|---|---|---|---|---|---|---|
| | | | | | 20° C. | 60° C. | 20° C.[27] | 60° C.[27] |
| Example 60 Comparative Example 61 | block copolymer A-2 unmodified | PC | 102 | 100 | 30 | 53 | — | — |
| Comparative Example 62 | block copolymer A-2 unmodified | PS | 97 | 90 | 34 | 47 | — | — |
| Comparative Example 63 | block copolymer A-2 unmodified | NR | 90 | 70 | 28 | 51 | — | — |
| Comparative Example 64 | block copolymer A-2 unmodified | PPE | 100 | 100 | 32 | 54 | — | — |
| Comparative Example 65 | block copolymer A-2 unmodified | PPS | 98 | 90 | 34 | 51 | — | — |
| Comparative Example 66 | block copolymer A-2 unmodified block copolymer A-2 | polystyrene | 120 | 100 | 27 | 63 | — | — |

Note:
[25]The abrasion resistance was determined according to the method of ASTM D-2228, and there is shown a relative value calculated based on the supposition that the abrasion of the composition of Comparative Example 66 comprising polystyrene as the thermoplastic polymer was 100. A larger value indicates a better abrasion resistance.
[26]The measurement was carried out at a compression ratio of 2.5% for a compression time of 22 hours according to JIS K-6301.
[27]At the step of extrusion kneading, 0.5 part by weight of zinc stearate was further added per 100 parts by weight of the sample C-2, and the compression permanent strain of the resulting composition comprising the ionic crosslinking product of the modified block copolymer was measured.
[28]A mixture of PC/PBT (mixing weight ratio = 2/1) and a mixture of PS/PA (mixing weight ratio = 2/1) were used as the thermoplastic polymer.

EXAMPLES 64 AND 65 AND COMPARATIVE EXAMPLE 67

Compositions comprising Surlyn A-1706 (the trade name of a partially metal-crosslinked ethylene-acrylic acid copolymer available from Du Pont Co., U.S.A.) as the component (a) were prepared according to the recipe shown in Table 25 by using mixing rolls. Test pieces of the obtained compositions were prepared by compression molding and the Izod impact strength thereof was measured to obtain results shown in Table 25, from which it is seen that the compositions of the present invention have an excellent Izod impact strength.

TABLE 25

| | | Example 64 | Example 65 | Comparative Example 67 |
|---|---|---|---|---|
| Composition | | | | |
| component (a) | amount (% by weight) | 20 | 20 | 20 |
| component (b) | kind | C-7 | E-4 | B-6 |
| | amount (% by weight) | 80 | 80 | 80 |
| Izod Impact Strength[5] (Kg · cm/cm, notched) | | 6.5 | 8.7 | 4.2 |

Note:
[5]See the Note under Table 5.

EXAMPLES 66 THROUGH 68 AND COMPARATIVE EXAMPLES 68 THROUGH 72

Compositions comprising a modified block copolymer and Evaflex 150 (the trade name of an ethylene-vinyl acetate copolymer available from Mitsui Polychemical Co., Ltd., Japan), as shown in Table 26, were prepared by using a screw type extruder having a diameter of 40 mm (single, L/D=28), and these compositions were tested with respect to the adhesiveness to an aluminum plate. The obtained results are shown in Table 26.

The modified hydrogenated block copolymer C-8 shown in Table 26 was prepared in the following manner.

A block copolymer of the S-B-S type having a styrene content of 20% by weight, a number average molecular weight of about 100,000 and a vinyl content in the butadiene block of about 35% was hydrogenated to obtain a hydrogenated block copolymer B-7 (having a hydrogenation degree of about 90%). The obtained copolymer B-7 was modified with maleic anhydride to obtain a modified hydrogenated block copolymer C-8 (the amount of maleic anhydride grafted onto the hydrogenated block copolymer was 0.25% by weight).

TABLE 26

| | | Example No. | | | Comparative Example No. | | | | |
|---|---|---|---|---|---|---|---|---|---|
| | | 66 | 67 | 68 | 68 | 69 | 70 | 71 | 72 |
| Composition | | | | | | | | | |
| Component (a) Evaflex 150 | Amount (% by weight) | 40 | 70 | 20 | 40 | 70 | 20 | 100 | — |
| Component (b) | Kind | C-1 | C-1 | C-8 | B-1 | B-1 | B-7 | — | B-1 |
| | Amount (% by weight) | 60 | 30 | 80 | 60 | 30 | 80 | — | 100 |
| Adhesion to aluminum[31] (peeling strength) (Kg/25 mm) | Before Immersion in Water | 13.2 | 6.5 | 3.5 | 1.5 | 1.1 | 1.7 | 1.0 | 2.0 |
| | After Immersion in Water | 3.1 | 1.8 | 1.9 | 0.3 | 0.2 | 0.4 | 0.1 | 0.5 |

Note:
[31]See the Note under Table 17.

EXAMPLE 69

The hydrogenated block copolymer B-1 was supplied into a screw type extruder having a diameter of 30 mm (twin, L/D=28), and simultaneously, 0.1 part by weight of Perhexa 25B [the trade name of 2,5-dimethyl-2,5-di(t-butylperoxy)hexane available from Nippon Yushi K.K., Japan] and 35 parts by weight of maleic anhydride, per 100 parts by weight of the hydrogenated block copolymer B-1, were supplied through the side supply inlet provided on the cylinder portion of the extruder. The maleinization reaction was carried out at a cylinder temperature of 250° C. The obtained block copolymer (C-9) was treated and analyzed in the same manner as described hereinbefore. It was found that the amount of maleic anhydride grafted onto the hydrogenated block copolymer was 18.5% by weight.

Compositions were prepared in the same manner as described in Examples 34 through 47 except that the copolymer C-9 was used as the modified hydrogenated block copolymer, and the physical properties of the compositions were examined. It was found that this composition is excellent in paint adhesion, impact resistance, gloss, weatherability and resistance to heat aging as well as the compositions obtained in Examples 34 through 47.

PROBABILITY OF UTILIZATION IN INDUSTRY

As will be apparent from the foregoing description, since the modified block copolymer composition of the present invention is a composition comprising a thermoplastic polymer and a modified block copolymer having a very good compatibility with each other, the composition of the present invention is very homogeneous and is excellent over the conventional mixtures of different polymers in mechanical characteristics, and furthermore, the composition of the present invention has an excellent weatherability and heat aging resistance. Accordingly, it is expected that the composition of the present invention will be effectively used in various fields. As specific uses now considered, there can be mentioned materials for machine parts, automobile parts, electrical parts, toys, industrial parts, belts, hoses, shoes, medical appliances, shock-absorbing rubber articles, daily necessaries, miscellaneous goods, construction articles, sheets, films, blow-molded articles, solution-type adhesives, hot melt adhesives, tackifiers and adhesive layers of laminated articles.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A modified block copolymer composition comprising:
   (a) at least one thermoplastic polymer selected from the group consisting of polar thermoplastic polymers each containing at least one polar functional group, polyoxymethylenes, polycarbonates, modified polycarbonates, polysulfones, modified polysulfones, nitrile polymers, polyphenylene ethers, modified polyphenylene ethers, polyarylene sulfides and modified polyarylene sulfides and
   (b) at least one modified block polymer which comprises a base block copolymer of at least one monovinyl substituted aromatic hydrocarbon polymer block A and at least one olefin compound polymer block B having an ethylenic unsaturation degree not exceeding 20%, said base block copolymer having at least one molecular unit grafted thereto, said at least one molecular unit containing at least one member selected from a carboxylic acid group and groups derived therefrom, said monovinyl substituted aromatic hydrocarbon being contained in said base block copolymer in an amount of over 60% by weight up to 95% inclusive by weight based on said base block copolymer, said at least one thermoplastic polymer (a) being present in a weight ratio of 90:10 to 5:95 relative to said at least one modified block copolymer (b),
   said polar thermoplastic polymers excluding said modified block copolymer (b).

2. A composition according to claim 1, wherein said modified polycarbonates, said modified polysulfones, said modified polyphenylene ethers and said modified polyarylene sulfides are respectively blends of polycarbonates, polysulfones, polyphenylene ethers and polyarylene sulfides with an alkenyl aromatic hydrocarbon polymer and/or an alkenyl aromatic hydrocarbon copolymer.

3. A composition according to claim 1, wherein said polar thermoplastic polymers each contain at least one polar functional group selected from an amino group, hydroxyl group, thiol group, carboxyl group, isocyanate group and epoxy group and groups derived therefrom.

4. A composition according to claim 3, wherein said polar thermoplastic polymers are polyamides.

5. A composition according to claim 3, wherein said polar thermoplastic polymers are thermoplastic polyesters.

6. A composition according to claim 3, wherein said polar thermoplastic polymers are thermoplastic polyurethanes.

7. A composition according to claim 3, wherein said polar thermoplastic polymers are polyvinyl alcohols.

8. A composition according to claim 3, wherein said polar thermoplastic polymers are polyvinyl esters.

9. A composition according to claim 3, wherein said polar thermoplastic polymers are ionomers of substrate copolymers of $\alpha,\beta$-unsaturated carboxylic acids and other monomers, said ionomers having carboxylic acid groups ionically crosslinked through at least one metal ion selected from the group consisting of monovalent, divalent and trivalent metal ions.

10. A composition according to claim 1, wherein said molecular unit containing at least one member selected from a carboxylic acid group and groups derived therefrom is grafted onto said base block copolymer in an amount of 0.05 to 30 parts by weight per 100 parts by weight of said base block copolymer.

11. A composition to claim 1, wherein said at least one modified block copolymer is a product obtained by the reaction of the base block copolymer of at least one monovinyl substituted aromatic hydrocarbon polymer block A and at least one olefin compound polymer block B having an ethylenic unsaturation degree not exceeding 20% with at least one modifying agent selected from the group consisting of unsaturated carboxylic acids and derivatives thereof.

12. A composition according to claim 11, wherein said product is one obtained by the addition reaction of the base block copolymer with at least one modifying agent selected from the group consisting of unsaturated carboxylic acids and derivatives thereof, said base block copolymer being a product produced by selectively hydrogenating a precursory block copolymer comprising at least one monovinyl substituted aromatic hydrocarbon polymer block and at least one polymer block composed mainly of a conjugated diene compound at its conjugated diene compound moiety to the extent that the ethylenic unsaturation degree of the polymer block composed mainly of the conjugated diene compound is 20% or less.

13. A composition according to claim 12, wherein the conjugated diene compound moiety of said precursory block copolymer has a vinyl content of 10 to 80%.

14. A composition according to claim 13, wherein the vinyl content is 25 to 65%.

15. A composition according to claim 12, wherein said at least one modifying agent is selected from the group consisting of maleic acid, maleic anhydride, maleic acid esters, maleic acid amides, maleic acid imides, fumaric acid, fumaric acid esters, fumaric acid amides, fumaric acid imides, itaconic acid, itaconic anhydride, itaconic acid esters, itaconic acid amides, itaconic acid imides, halogenated maleic acid, halogenated maleic anhydride, halogenated maleic acid esters, halogenated maleic acid amides, halogenated maleic acid imides, cis-4-cyclohexene-1,2-dicarboxylic acid, cis-4-cyclohexene-1,2-dicarboxylic anhydride, cis-4-cyclohexene-1,2-dicarboxylic acid esters, cis-4-cyclohexene-1,2-dicarboxylic acid amides, cis-4-cyclohexene-1,2-dicarboxylic acid imides, endo-cis-bicyclo(2,2,1)-5-heptene-2,3-dicarboxylic acid, endo-cis-bicyclo(2,2,1)-5-heptene-2,3-dicarboxylic anhydride, endo-cis-bicyclo(2,2,1)-5-heptene-2,3-dicarboxylic acid esters, endo-cis-bicyclo(2,2,1)-5-heptene-2,3-dicarboxylic acid amides, endo-cis-bicyclo(2,2,1)-5-heptene-2,3-dicarboxylic acid imides, acrylic acid, acrylic esters, acrylic amide, methacrylic acid, methacrylic esters and methacrylic amide.

16. A composition according to claim 1, wherein said modified block copolymer is ionically crosslinked through at least one metal ion selected from the group consisting of monovalent, divalent and trivalent metal ions to form an ionically crosslinked modified block copolymer.

17. A composition according to claim 16, wherein the ionical crosslinking of said modified block copolymer through said metal ion is made in a ratio of 0.1:3.0, said ratio being given in terms of a molar ratio of metal ion relative to the total of carboxylic acid group and groups derived therefrom contained in said modified block copolymer.

18. A composition according to claim 16, wherein said metal ion is at least one member selected from the group consisting of lithium, sodium, potassium, magnesium, calcium, zinc and aluminum ions.

* * * * *

REEXAMINATION CERTIFICATE (1048th)

United States Patent [19]
Shiraki et al.

[11] B1 4,628,072
[45] Certificate Issued  Apr. 25, 1989

[54] MODIFIED BLOCK COPOLYMER COMPOSITION

[75] Inventors: Toshinori Shiraki, Yamato; Fusakazu Hayano, Chigasaki; Hideo Morita, Yokohama, all of Japan

[73] Assignee: Asahi Kasei Kogyo Kabushiki Kaisha, Osaka, Japan

Reexamination Request:
No. 90/001,406, Dec. 23, 1987

Reexamination Certificate for:
Patent No.: 4,628,072
Issued: Dec. 9, 1986
Appl. No.: 432,923
Filed: Aug. 13, 1982

[22] PCT Filed: Aug. 13, 1982
[86] PCT No.: PCT/JP82/00316
§ 371 Date: Sep. 30, 1982
§ 102(e) Date: Sep. 30, 1982
[87] PCT Pub. No.: WO83/00492
PCT Pub. Date: Feb. 17, 1983

[30] Foreign Application Priority Data
Aug. 13, 1981 [JP] Japan ............... 56-125882
Aug. 24, 1981 [JP] Japan ............... 56-131650

[51] Int. Cl.$^4$ ............ C08L 51/00; C08L 53/00; C08L 53/02
[52] U.S. Cl. ............................. 525/57; 525/64; 525/66; 525/67; 525/68; 525/78; 525/80; 525/84; 525/92; 525/95; 525/96; 525/98
[58] Field of Search ............. 525/57, 64, 66, 67, 525/68, 78, 80, 84, 92, 95, 96, 98

[56] References Cited
U.S. PATENT DOCUMENTS 3,607,977 9/1971 Taylor et al. .
3,688,125 6/1972 Anderson .
3,985,829 10/1976 Falk ......................... 525/310
4,007,311 2/1977 Harlan, Jr. ................. 428/246
4,033,888 9/1977 Kiovsky .
4,077,893 3/1978 Kiovsky .
4,264,747 4/1981 Paddock ..................... 525/86
4,282,132 8/1981 Benda et al. ............... 525/279
4,292,414 9/1981 Saito et al. .
4,427,828 1/1984 Hergenrother et al. .
4,429,076 3/1984 Saito et al. .
4,480,057 10/1984 Sano .
4,508,874 4/1985 Hergenrother et al. .
4,578,429 3/1986 Gergen et al. .

FOREIGN PATENT DOCUMENTS 48-62851 9/1973 Japan .
52-150457 12/1977 Japan .
54-122382 9/1979 Japan .
54-144477 11/1979 Japan .
55-13719 1/1980 Japan .
55-13727 1/1980 Japan .
55-60511 5/1980 Japan .
50-85695 7/1980 Japan .
55-165931 12/1980 Japan .
56-62805 5/1981 Japan .
56-51349 5/1981 Japan .
1260897 1/1972 United Kingdom .

Primary Examiner—Wilbert J. Briggs, Sr.

[57] ABSTRACT

A modified block copolymer composition comprising a thermoplastic polymer and a modified block copolymer consisting essentially of a base block copolymer of a monovinyl substituted aromatic hydrocarbon polymer block and an olefin compound polymer block having an ethylenic unsaturation degree not exceeding 20%, the base block copolymer having a molecular unit containing a carboxylic acid group and/or a group derived therefrom grafted thereto. The modified block copolymer composition of the present invention is a resinous composition excellent in impact resistance, adhesion, paint adhesion, weatherability, resistance to thermal deterioration, transparency and gloss or a rubbery or leather-like composition excellent in heat resistance, abrasion resistance, compression set resistance, adhesion, transparency, oil resistance, weatherability and resistance to heat aging.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 10–12, 15 and 17 are determined to be patentable as amended.

Claims 2, 4–9, 13, 14, 16 and 18, dependent on an amended claim are determined to be patentable.

New claims 19–22 are added and determined to be patentable.

1. A modified block copolymer composition comprising:
   (a) at least one thermoplastic polymer selected from the group consisting of polar thermoplastic polymers each containing at least one polar functional group, polyoxymethylenes, polycarbonates, modified polycarbonates, polysulfones, modified polysulfones, nitrile polymers, polyphenylene ethers, modified polyphenylene ethers, polyarylene sulfides and modified polyarylene sulfides and
   (b) at least one modified block [polymer] *copolymer* which comprises a base block copolymer of at least [one] *two* monovinyl substituted aromatic hydrocarbon polymer [block] *blocks* A and at least one olefin compound polymer block B having an ethylenic unsaturation degree not exceeding 20%, said base block copolymer having at least one molecular unit grafted thereto, said at least one molecular unit containing at least one member selected from a [carboxylic] *dicarboxylic* acid group and groups derived therefrom, said monovinyl substituted aromatic hydrocarbon being contained in said base block copolymer in an amount of over 60% by weight up to 95% inclusive by weight based on said base block copolymer, said at least one thermoplastic polymer (a) being present in a weight ratio of 90:10 to 5:95 relative to said at least one modified block copolymer (b),
   said polar thermoplastic polymers excluding said modified block copolymer (b).

3. A composition according to claim 1, wherein said polar thermoplastic polymers each contain at least one polar functional group selected from *the group consisting of* an amino group, hydroxyl group, thiol group, carboxyl group, isocyanate group, [and] epoxy group, [and groups derived therefrom] *urethane group, ester group, amide group, ammonium salt group and metal carboxylate group*.

10. A composition according to claim 1, wherein said molecular unit containing at least one member selected from a [carboxylic] *dicarboxylic* acid group and groups derived therefrom is grafted onto said base block copolymer in an amount of 0.05 to 30 parts by weight per 100 parts by weight of said base block copolymer.

11. A composition *according* to claim 1, wherein said at least one modified block copolymer is a product obtained by the reaction of the base block copolymer of at least [one] *two* monovinyl substituted aromatic hydrocarbon polymer [block] *blocks* A and at least one olefin compound polymer block B having an ethylenic unsaturation degree not exceeding 20% with at least one modifying agent selected from the group consisting of unsaturated [carboxylic] *dicarboxylic* acids and derivatives thereof.

12. A composition according to claim 11, wherein said product is one obtained by the addition reaction of the base block copolymer with at least one modifying agent selected from the group consisting of unsaturated [carboxylic] *dicarboxylic* acids and derivatives thereof, said base block copolymer being a product produced by selectively hydrogenating a precursory block copolymer comprising at least [one] *two* monovinyl substituted aromatic hydrocarbon polymer [block] *blocks* and at least one polymer block composed mainly of a conjugated diene compound at its conjugated diene compound moiety to the extent that the ethylenic unsaturation degree of the polymer block composed mainly of the conjugated diene compound is 20% or less.

15. A composition according to claim 12, wherein said at least one modifying agent is selected from the group consisting of maleic acid, maleic anhydride, maleic acid esters, maleic acid amides, maleic acid imides, fumaric acid, fumaric acid esters, fumaric acid amides, fumaric acid imides, itaconic acid, itaconic anhydride, itaconic acid esters, itaconic acid amides, itaconic acid imides, halogenated maleic acid, halogenated maleic anhydride, halogenated maleic acid esters, halogenated maleic acid amides, halogenated maleic acid imides, cis-4-cyclohexene-1,2-dicarboxylic acid, cis-4-cyclohexene-1,2-dicarboxylic anhydride, cis-4-cyclohexene-1,2-dicarboxylic acid esters, cis-4-cyclohexene-1,2-dicarboxylic acid amides, cis-4-cyclohexene-1,2-dicarboxylic acid imides, endo-cis-bicyclo(2,2,1)-5-heptene-2,3-dicarboxylic acid, endo-cis-bicyclo(2,2,1)-5-heptene-2,3-dicarboxylic anhydride, endo-cis-bicyclo(2,2,1)-5-heptene-2,3-dicarboxylic acid esters, endo-cis-bicyclo(2,2,1)-5-heptene-2,3-dicarboxylic acid amides[,] *and* endo-cis-bycyclo(2,2,1)-5-heptene-2,3-dicarboxylic acid imides[, acrylic acid, acrylic esters, acrylic amide, methacrylic acid, methacrylic esters and methacrylic amide].

17. A composition according to claim 16, wherein the ionical crosslinking of said modified block copolymer through said metal ion is made in a ratio of [0.1:3.0] *0.1 to 3.0*, said ratio being given in terms of a molar ratio of metal ion relative to the total of [carboxylic] *dicarboxylic* acid group and groups derived therefrom contained in said modified block copolymer.

*19. A composition according to claim 15, wherein said modifying agent is maleic anhydride.*

*20. A composition according to claim 1, wherein said at least one modified block copolymer (b) is a three block copolymer consisting essentially of two of said polymer blocks A and one of said polymer blocks B.*

*21. A composition according to claim 1, wherein said at least one modified block copolymer (b) is a four block copolymer consisting essentially of two of said polymer blocks A and two of said polymer blocks B.*

*22. A molded product formed from the composition of claim 1, 2, 3, 4, 5, 6, 7, 8, 9, 10, 11, 12, 13, 14, 15, 16, 17, 18, 19, 20 or 21.*

\* \* \* \* \*